US007253914B2

(12) United States Patent
Tomita

(10) Patent No.: US 7,253,914 B2
(45) Date of Patent: Aug. 7, 2007

(54) PRINT DATA PROCESSING APPARATUS, PRINT CONTROL METHOD, AND PRINT CONTROL PROGRAM

(75) Inventor: Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 09/986,254

(22) Filed: Nov. 8, 2001

(65) Prior Publication Data

US 2002/0060805 A1 May 23, 2002

(30) Foreign Application Priority Data

Nov. 21, 2000 (JP) ............................. 2000-354902
Oct. 17, 2001 (JP) ............................. 2001-319286

(51) Int. Cl.
*G06F 15/00* (2006.01)
(52) U.S. Cl. ..................... 358/1.15; 358/1.13; 358/1.9; 382/112; 347/19
(58) Field of Classification Search ............... 358/1.15, 358/1.13, 1.9; 382/112; 347/19
See application file for complete search history.

(56) References Cited

U.S. PATENT DOCUMENTS 5,471,564 A * 11/1995 Dennis et al. ............. 358/1.15

| | | | |
|---|---|---|---|
| 6,241,334 B1 * | 6/2001 | Haselby | 347/19 |
| 6,301,013 B1 * | 10/2001 | Momose et al. | 358/1.15 |
| 6,665,081 B1 * | 12/2003 | Suzuki et al. | 358/1.13 |
| 6,665,425 B1 * | 12/2003 | Sampath et al. | 382/112 |
| 6,853,464 B1 * | 2/2005 | Ueda et al. | 358/1.9 |
| 6,891,632 B2 * | 5/2005 | Schwartz | 358/1.15 |

FOREIGN PATENT DOCUMENTS

JP    11-129583    5/1999

* cited by examiner

*Primary Examiner*—Twyler Lamb
*Assistant Examiner*—Mark R. Milia
(74) *Attorney, Agent, or Firm*—Fitzpatrick, Cella, Harper & Scinto

(57) ABSTRACT

A print control method performs print processing in an optical operation mode that is automatically determined in response to a print request from an application program. The print control method queries a user about evaluation of print speed or the result of printing obtained in the print processing, and obtains a response to the query. When performing print processing in response to a later print request, the operation mode is determined based on the response. The print control method generates print data in intermediate condition which is not dependent on a particular page description language, and performs print processing based on the result of analyzing the print data.

18 Claims, 16 Drawing Sheets

DIFFERENCE GENERATED WHEN SPOOL IS / IS NOT USED

FIG. 7

NEW-GENERATION SUPER-TELEPHOTO LENS WITH
A BUILT-IN CAMERA-SHAKE CORRECTION MECHANISM,
ENABLING A MAXIMUM LEVEL IMAGE

"CANON LENS EF400mm"

1. SUPER HIGH IMAGE QUALITY BASED ON NEW OPTICAL DESIGN
By using UD glass for the second and third lenses, and fluoric material for the fifth lens, the second spectrum can be minimized which is likely to occur in a telephoto lens and which is a factor of deterioration in image quality. This realizes high resolution and high contrast image quality.

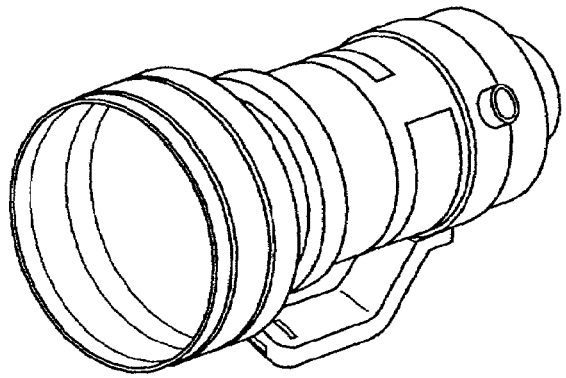

600-dpi IMAGE DATA WITH 8 BITS FOR EACH OF RGB

2. BUILT-IN CAMERA-SHAKE CORRECTION MECHANISM
A camera-shake correction mechanism is an advanced technology of Canon in which, by moving part (correction optical system) of an optical system perpendicularly to an optical axis in accordance with a hand shake detected by an in-lens vibrating gyroscope, rays of light are refracted in a direction canceling an image blur. This provides approximately two-stage correction effects in shutter speed. For the lens on sale this time, a dedicated camera-shake correction unit in which a large output actuator is employed has been newly developed in order to drive the correction optical system for a large-aperture super telephoto lens.

The camera-shake correction mechanism has the following feature :
camera-shake correction mechanism 2

FIG. 8

| DATE OF PRINTING | PRINTER | OPERATION STATUS P;01, P.02, P.03, P.04, P.05, · · · |
|---|---|---|
| 1999/05/25 | mitsu | IMAGE, PDL, IMAGE, PDL, PDL, |
| | | |

FIG. 9

| | | |
|---|---|---|
| TIME AND DATE OF PRINTING | | |
| PRINTER | | |
| FILE NAME | | |
| DATE OF FILE CREATION | | |
| DATE OF FILE UPDATING | | |
| APPLICATION NAME | | |
| APPLICATION VERSION | | |
| DRIVER OPERATION STATE | | |
| TOTAL NUMBER OF PAGES | | |
| 1ST PAGE | TEXT | NUMBER OF OBJECTS |
| | | MAXIMUM POINT SIZE |
| | GRAPHICS | NUMBER OF OBJECTS |
| | | ROP |
| | IMAGE | RESOLUTION, GRADATION |
| | | DATA SIZE |
| | | ROP |
| 2ND PAGE | TEXT | NUMBER OF OBJECTS |
| | | MAXIMUM POINT SIZE |
| | GRAPHICS | NUMBER OF OBJECTS |
| | | ROP |
| | IMAGE | RESOLUTION, GRADATION |
| | | DATA SIZE |
| | | ROP |

FIG. 10

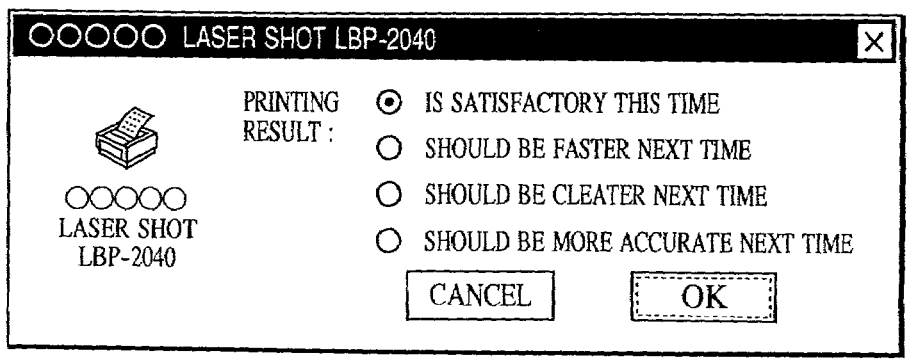

PRINT DATA PROCESSING APPARATUS, PRINT CONTROL METHOD, AND PRINT CONTROL PROGRAM

BACKGROUND OF THE INVENTION

1. Field of the Invention

The present invention relates to a print data processing apparatus, a print control method, a computer-readable print control program, and a storage medium containing the print control program, which are used to perform printing processes in response to image-forming commands from an application.

2. Description of the Related Art

In conventional print processing (specifically, printer driver processing) in a print data processing system, concerning the selection of print modes for use in printing in a case in which a printer has a plurality of print conditions (print modes), for example, a printer description language (PDL) mode and an image mode, an apparatus that has a function of automatically selecting a print mode for use in printing has been proposed in Japanese Unexamined Patent Application Publication No. 11-129583. Other print conditions, such as color gradation and resolution, are designated by a user, or are fixed for processing.

A printer driver having such a function of automatically selecting a print mode has an advantage in that print settings, which are complicated to the user, do not need to be determined. However, a user who is discontent with the time and result of printing executed by the print settings determined by the automatically selecting function operates or selects the print mode.

In order that the user may operate and set a print condition (print mode), the user must understand combinations of the characteristics of documents to be printed and optimal print conditions (print modes) thereto. Thus, in general, ordinary users who are not interested in print processing must use the automatically selecting function which frees them from complicated operations, even if they are discontent with print conditions determined by the automatically selecting function. Accordingly, a problem occurs in that the automatically selecting function cannot cope with a user's intention for each time. In addition, known automatic determination of print modes by a printer driver does not reflect the characteristic of each application. Depending on the type of application, even applications belonging to a series have different characteristics. For example, even drawing (figure drawing) applications include an application adapted for the PDL mode and an application adapted for the image mode, depending on the output form of an image-forming function to the graphics engine of an operating system (OS). This causes a problem in that the conventional print-mode automatic-selecting function cannot cope with an application in use.

SUMMARY OF THE INVENTION

The present invention is made in order to eliminate the foregoing problems and is intended to provide construction for eliminating user's dissatisfaction by using a manner in which user's intention is reflected by a print-mode automatic-selecting function that performs printing in a particular print mode selected from among a plurality of print modes.

It is an object of the present invention to provide a print-mode automatic-selecting function which, in the above construction, analyzes information to be printed and classifies the entirety of the information as what type of document, and which performs printing based on the classified information in a particular print mode which is selected from among a plurality of print modes.

It is another object of the present invention to provide construction which, by recording, in each application, each print mode selected in the above construction, determines a print mode in the next printing in accordance with the type of an application.

If is another object of the present invention to provide construction in which, in the above construction, evaluation for reflecting user's intention is executed by a printer driver when a predetermined command such as test print is issued.

To these ends, according to an aspect of the present invention, the foregoing objects are achieved through provision of a print control method for performing print processing in an optimal operation mode which is automatically determined in response to a print request from an application program. The print control method includes a response acquiring step in which, by querying evaluation of a printing speed for the print processing or the quality of print produced by the print processing, a response is acquired, and a determination step in which, when the print processing is performed in response to a later print request, the operation mode is determined based on the response acquired in the response acquiring step.

Preferably, the print control method further includes a print data generating step for, in response to the print request from the application program, generating print data in intermediate condition which is not dependent on a particular page description language, and a print data analyzing step for analyzing the generated print data after temporarily storing the generated print data.

The print control method may further include a step in which, based on a predetermined selection criterion used when the optimal operation mode is automatically determined from data obtained by analyzing the print data and on the response acquired in the response acquiring step, a selection criterion for newly performing automatic setting of the operation mode is set. In the determination step, the operation mode is determined based on data obtained by analyzing print data which is input in response to the later print request and on the newly set selection criterion.

The print control method may further include a classification step for outputting classification data by analyzing the print data so that the print data is classified into one of classifications based on the type of the print data, and a storage step in which, based on the response acquired in the response acquiring step and the classification data output in the classification step, a printing-mode-selecting criterion used when the print processing is performed in response to the later print request is determined for each of the classifications, and the determined selecting criterion is stored.

In the determination step, the determined selecting criterion stored in the storage step may be used as a criterion for, by comparing each of the classifications with the print data, determining an operation mode used when the print processing is performed on the print data to be printed.

In the response acquiring step, by using a plurality of options to query the evaluation of the printing speed for the print processing or the quality of print produced by the print processing, a selected option may be acquired as the response.

The print control method may further include a test-print designation step for designating a test print in which a process of querying the evaluation of the print is performed.

When the test print is designated in the test-print designation step, the evaluation of the print is queried in the response acquiring step.

According to another aspect of the present invention, there is provided a function of automatically selecting a printing mode. The function makes it possible to reflect the intention of a user who cannot control and properly set printing conditions (operation modes) although the user is discontent with an automatically set printing mode.

According to another aspect of the present invention, there is provided a print data processing apparatus in which, when the intention of a user is reflected, the apparatus accepts a response to a query which has simple options and which can be responded by an even a user who cannot control or properly set printing conditions (operation modes), and performs selection of a later printing mode based on the response. In addition, a print control method therefor, and a storage medium containing a computer-readable program used therewith are provided.

According to the present invention, as described above, by allowing a user to select one of options, printing conditions are appropriately changed so that print processing or the result of printing approaches that desired by the user. This operates so that a means of printing matching the intention of the user is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is an illustration showing a printed sample in which an operation mode is easy to set mistakenly.

FIG. 8 is an illustration showing the result of automatic operation-mode determination in an embodiment of the present invention.

FIG. 9 is an illustration showing a form of detection information to be collected in an embodiment of the present invention.

FIG. 10 is an illustration showing a form of a message screen for querying a user in an embodiment of the present invention.

DESCRIPTION OF THE PREFERRED EMBODIMENTS

With reference to the accompanying drawings, embodiments of the present invention are described below.

Figure 1:
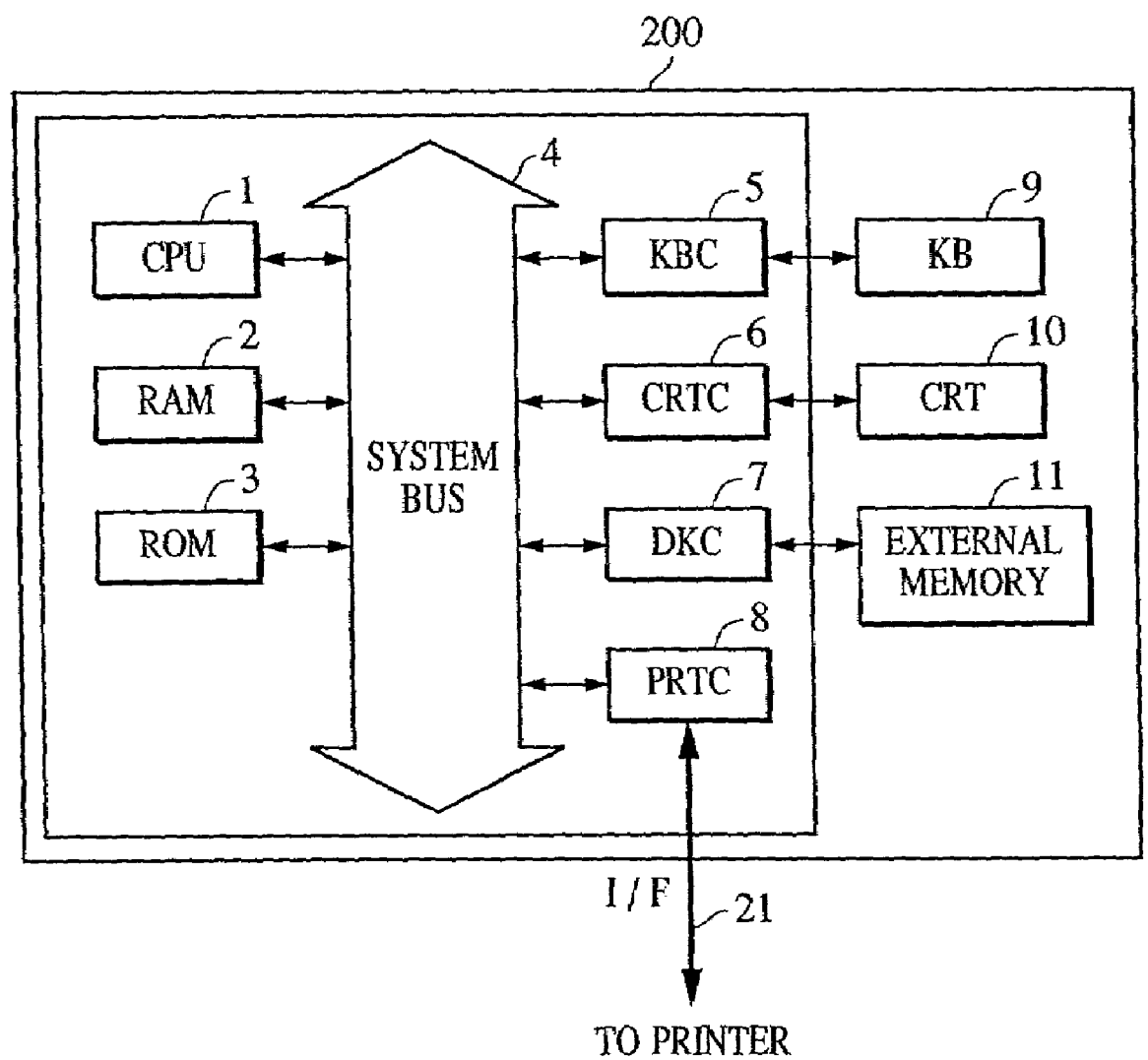
FIG. 1 is a block diagram showing the basic structure of a host computer to which a data processing apparatus according to an embodiment of the present invention can be applied.

FIG. 1 is a block diagram showing the structure of a host computer 200 including a print data processing apparatus according to an embodiment of the present invention. The host computer 200 includes a central processing unit (CPU) 1 that, based on a program stored in a read-only memory (ROM) 3 or a document processing program stored in an external memory 11, executes processing on a document including a figure, an image, characters, and a table (including a spreadsheet). The CPU 1 controls the other devices connected to a system bus 4.

The ROM 3 or the external memory 11 stores an operating system (OS) as a program for controlling the CPU 1, font data for use in the document processing, and various types of data, etc. A random access memory (RAM) 2 functions as a main memory or a work memory for the CPU 1. A keyboard controller (KBC) 5 controls inputs from a keyboard (KB) 9 and a pointing device (not shown) such as a mouse. A cathode-ray-tube controller (CRTC) 6 controls a picture displayed on a cathode-ray tube (CRT) 10. A disk controller (DKC) 7 controls the accessing of the external memory 11, which is, for example, a hard disk (HD) or floppy disk (FD) containing a boot program, various applications, font data, a user file, an editing file, and print-data generating program (hereinafter referred to as a "printer driver") as a preferred embodiment of a print control program of the present invention. A printer controller (PRTC) 8 is connected to a printer 100 via a predetermined bidirectional interface 21 and executes communication-control processing. The CPU 1 performs, for example, the loading (rasterization) of an outline font into a display-information RAM provided in the RAM 2, whereby WYSIWYG can be performed on the CRT 10. Based on a command designated by a cursor on the CRT 10 which corresponds to the mouse (not shown) or the like, the CPU 1 opens various recorded windows and executes various data processes. When performing printing, a user opens a window concerning print settings, determines settings on the printer 100, and performs the setting of a print processing method for the printer driver, which includes the selection of a print mode.

Figure 2:
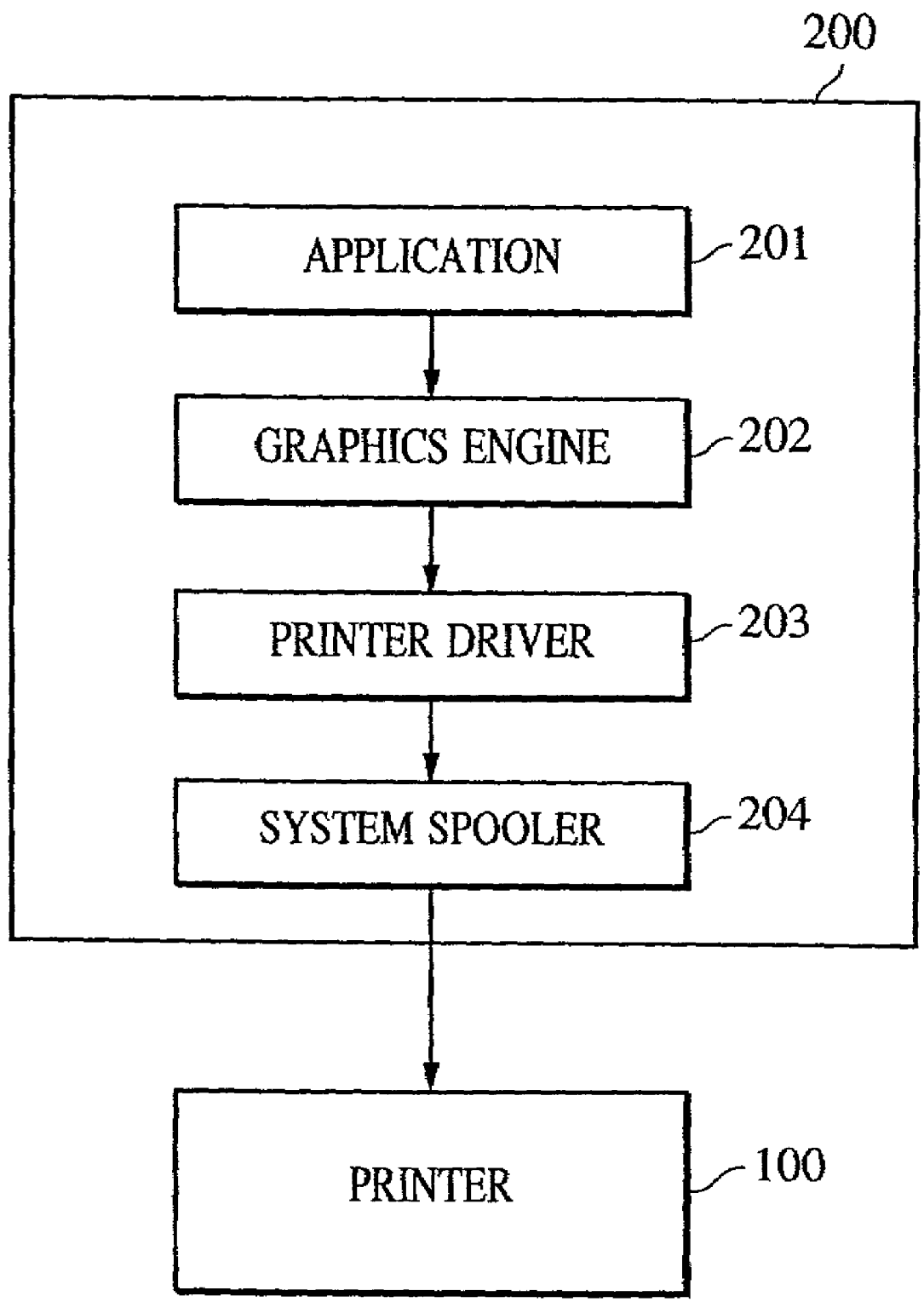
FIG. 2 is a block diagram illustrating the flow of data in the data processing apparatus shown in FIG. 1.
Figure 3:
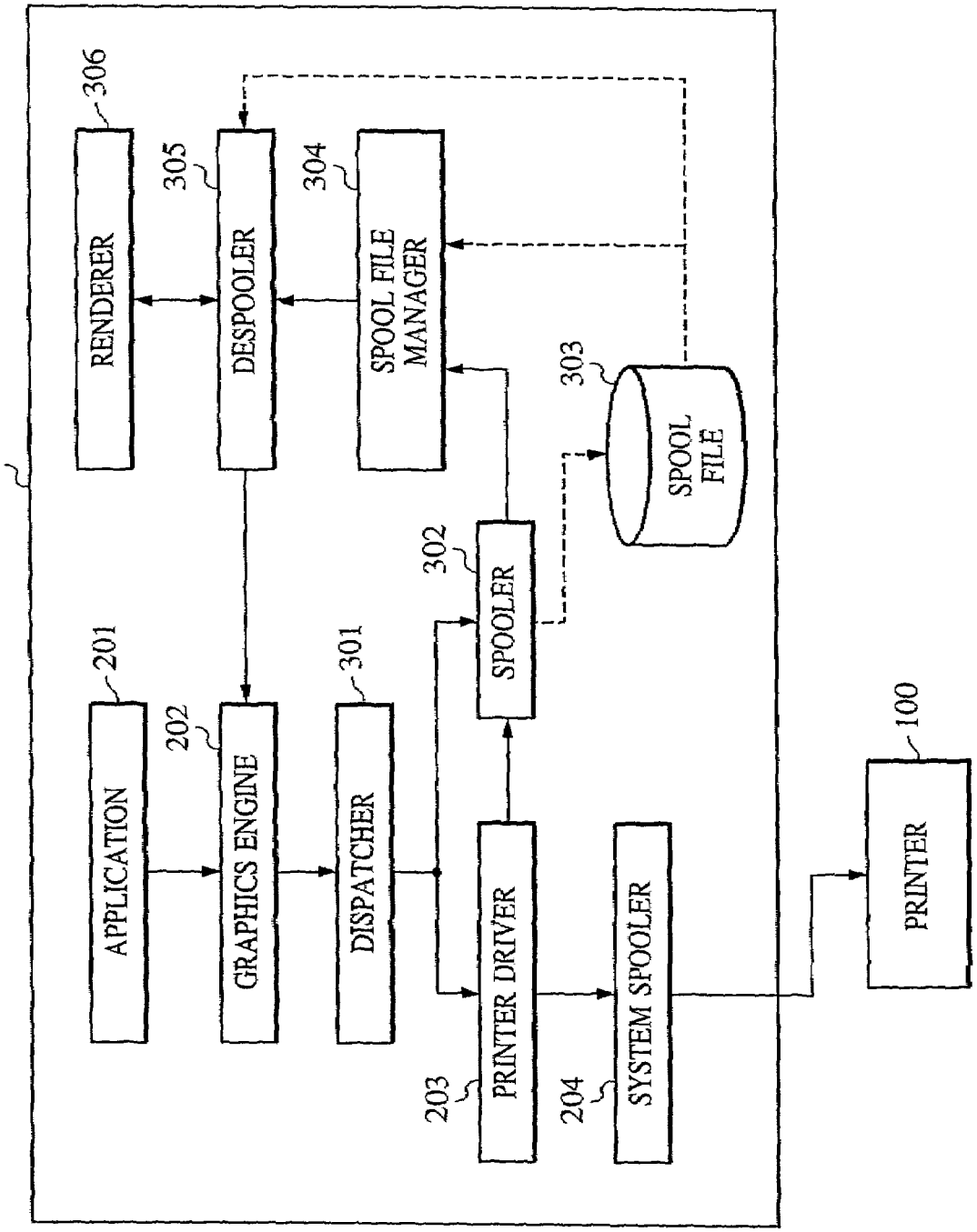
FIG. 3 is a block diagram illustrating the flow of data in the data processing apparatus shown in FIG. 1.

FIGS. 2 and 3 are block diagrams showing the flow of print data in the print data processing apparatus shown in FIG. 1. FIGS. 2 and 3 show general construction of print data in the host computer 200 or a dedicated print server to which the printer 100 is connected directly or via a network.

In FIG. 2, an application 201, a graphics engine 202, a printer driver 203, and a system spooler 204 exist as files stored in the external memory 11, which is a CD-ROM or a hard disk. They are program modules. Each of the program modules is executed after being loaded into the RAM 2 by the OS or a module using it.

The application 201 and the printer driver 203 can be additionally stored in the external memory 11 via an FD, a CD-ROM, or a network (not shown). The application 201 stored in the external memory 11 is executed after it is loaded into the RAM 2. When the application 201 controls the printer 100 to perform printing, the graphics engine 202, which is executable after it is similarly loaded into the RAM 2, is used to perform outputting (image-forming).

The graphics engine 202 loads the printer driver 203, which is provided for each type of a printer, from the external memory 11 into the RAM 2, transforms an image-forming function (generally called a "graphic device interface (GDI) function") as an output from the application 201 into an image-forming function (generally called a "device driver interface (DDI) function") that can be interpreted by the printer driver 203, and outputs the obtained DDI function to the printer driver 203. The printer driver 203 transforms the received DDI function into a printer control command (print data) which can be interpreted by the printer 100, and generates a print job by using a job language to process the printer data. The print job including the printer control command is output to the printer 100 via the interface 21 after passing through the system spooler 204, which is loaded into the RAM 2 by the OS.

The print data processing apparatus shown in FIG. 3 according to a preferred embodiment of the present invention is obtained by extending the functions of the print data processing apparatus shown in FIG. 2. In this apparatus, when an image-forming command (GDI function) is sent from a graphics engine 202 to a printer driver 203, a spool file 303 composed of intermediate codes is temporarily generated.

Figure 4A:
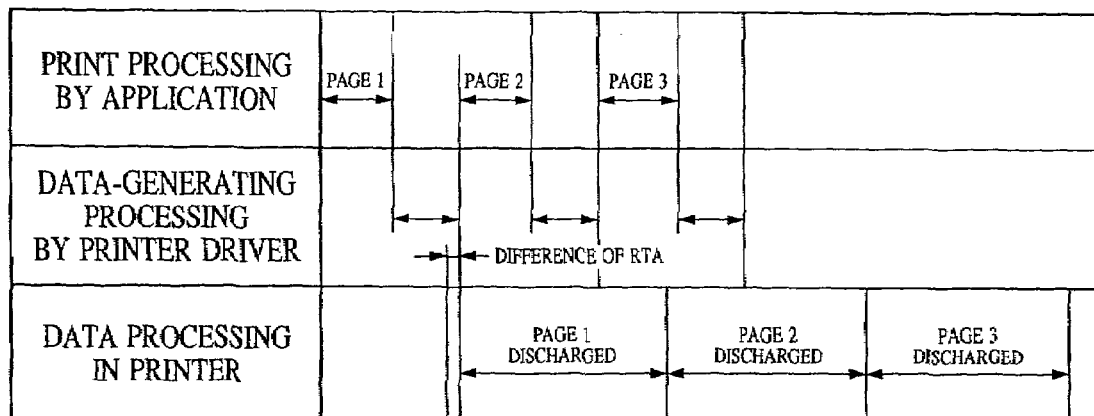
FIG. 4 is a schematic drawing showing time-series comparison between (A) the operation of the printer driver 203 shown in FIG. 2 and (b) the operation of the operation of the printer driver 203 shown in FIG. 3.
Figure 4B:
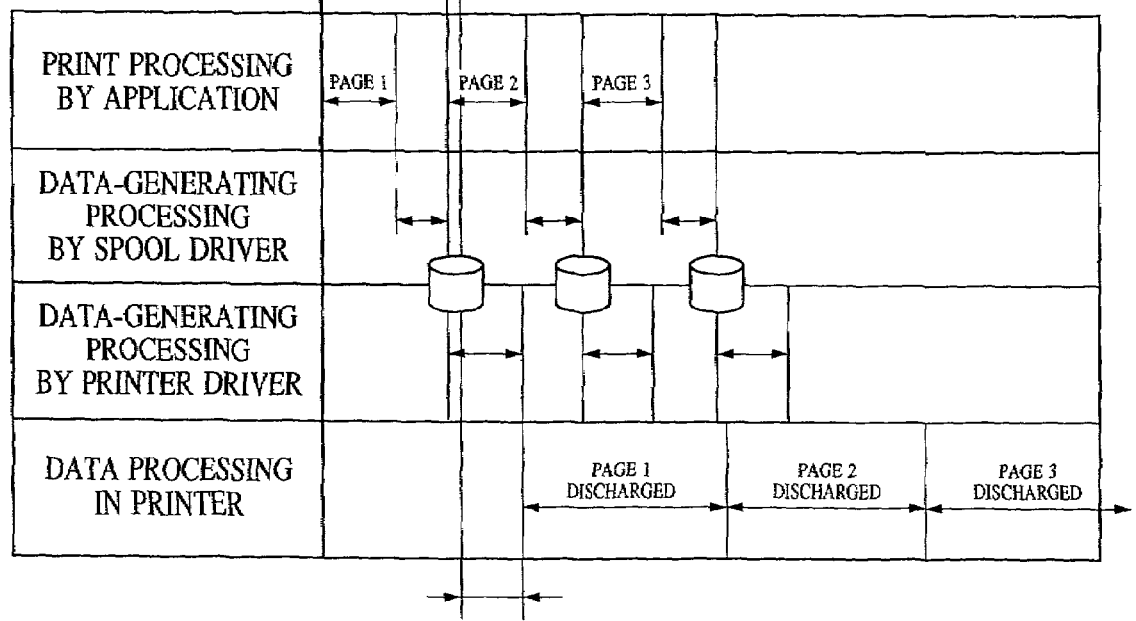

In the print data processing apparatus shown in FIG. 2, the application 201 is released from the print processing at the time the printer driver 203 has finished converting all print commands sent from the graphics engine 202 into printer control commands. In the print data processing apparatus shown in FIG. 3, the application 201 is released from the print processing at the time the spooler 302 has converted all print commands into intermediate code data and has output the intermediate code data to the spool file 303. Normally, from the point of view of release of application, the latter requires a shorter time. However, viewed from a time up to completion of outputting the printing result from the printer 100, the latter tends to require a more time in proportion to the time for generating the spool file 303. The relationship between the former and the latter is shown in FIG. 4. FIG. 4 shows a schematic time-series relationship between the operation of the driver 203 in FIG. 2 and the operation of the driver 203 in FIG. 3.

In the process of generating the spool file 303, the print data processing apparatus in FIG. 3 can analyze in-page image-forming information and can process data for the content of the generated spool file 303. These can implement additional printing functions that general applications do no have, such as automatic selection of the optimal operation mode, enlargement and reduction, and so-called "N-up" printing that prints one page containing a plurality of reduced pages.

For these purposes, the print data processing apparatus in FIG. 2 has been extended in function to a system that uses intermediate codes to perform spooling, such as the print data processing apparatus in FIG. 3. In order to automatically select the optimal operation mode and to process print data, the sequential steps are performed: a window provided by the ordinary print driver 203 is used to determine settings; the printer driver 203 stores the settings in the RAM 2 or the external memory 11; and the process is implemented such that a spool file manager 304 and a despooler 305 refer to the stored settings.

The structure of the print data processing apparatus in FIG. 3 is further described below.

A dispatcher 301 receives a print command from the graphics engine 202. When the received print command is a print command issued from the application 201 to the graphics engine 202, the dispatcher 301 loads the spooler 202 stored in the external memory 11 into the RAM 2, and sends the print command not to the printer driver 203 but to the spooler 302. The spooler 302 converts the received print command into an intermediate code and output the code to the spool file 303. The spool file 303 is not formed by a single file but is the general term for a plurality of files. When the spooler 302 converts the received print command into the intermediate code, it analyzes the print command to acquire information such as what type of printing the print command designates, and what type of load in the printer side the print command is. The analysis is performed for the automatic selection of the optimal operation mode. The result of the analysis is separately stored in the spool file 303. From the printer driver 203, processing-setting information on print data which is set for the printer driver 203 is acquired and stored in the spool file 303 by the printer driver 203. The spool file 303 is generated as a file in the external memory 11, but can be generated in the RAM 2. The spooler 302 loads the spool file manager 304 stored in the external memory 11 into the RAM 2, and notifies the spool file manager 304 of the condition of the generation of the spool file 303. After that, if the spool file manager 304 has determined again, in accordance with the content of the processing-setting information stored in the spool file 303, that printing can be performed by using the graphics engine 202, the spool file manager 304 loads the despooler 305 into the RAM 2, and instructs the despooler 305 to perform print processing on the intermediate code described in the spool file 303.

When being instructed by the spool file manager 304, the despooler 305 processes the intermediate code included in the spool file 303 in accordance with information on the result of analysis of the optimal operation mode and the content of the processing-setting information which are included in the spool file 303, and uses a renderer 306 in the despooler 305 to develop the intermediate code into a print image at high speed, as required. The determination of whether the intermediate code is developed into the print image is performed such that an optimization determination processor in the despooler 305 reads a file containing the result of the analysis performed by the spooler 302, and comprehensively considers the file, together with information such as the processing-setting information. The determination may be performed in units of pages and may be performed in units of image-forming objects. In any case, the despooler 305 reads the intermediate code from the spool file 303, converts the intermediate code into a form adapted for the Application Programming Interface (API), and outputs the converted form again via the graphics engine 202. When the print command received by the dispatcher 301 from the graphics engine 202 is a print command issued from the dispatcher 301 to the graphics engine 202, the dispatcher 301 outputs the print command not to the spooler 302 but to the printer driver 203. When being instructed by the dispatcher 301, the printer driver 203 generates and outputs a printer control command to the printer 100 via the system spooler 204.

Figure 5:
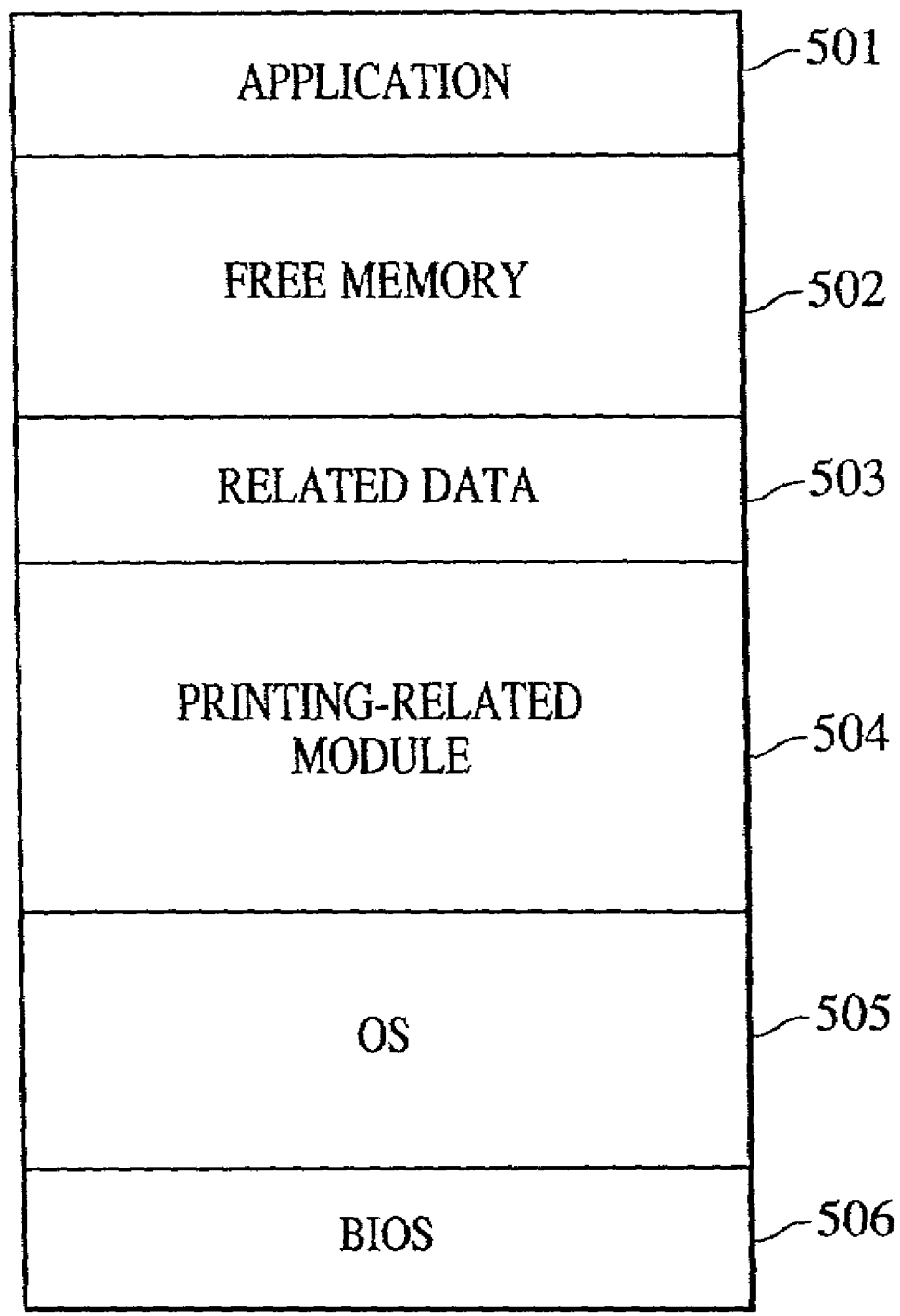
FIG. 5 is an illustration showing an example of the memory map of the RAM 2 shown in FIG. 1.

FIG. 5 shows an example of the memory map of the RAM 2 in the host computer 200 in FIG. 1. The memory map shows that a printing-related module 504 which includes a sequential print-data generating program in this embodiment, an application 501, related data 503, an OS 505, and a basic input/output system (BIOS) 506 are executable after being loaded into the RAM 2 in the host computer 200. The memory map also shows a free memory 502.

The basic structures of the print data processing apparatuses according to the embodiments of the present invention have been described. Next, the process for automatically selecting the optimal operation mode is described. Before this description, the necessity of the process for automatically selecting the optimal operation mode is briefly mentioned.

In the related art, there are two types of printer drivers depending on whether an image-forming process in the print processing is performed on the host side or on the printer side. A type of printer driver in which the host side performs processing up to the image-forming process is called an "image drivers". Another type of printer driver in which the printer side performs the image-forming process by using the PDL thereof is called a "PDL driver". Each type of printer driver has the following merits and demerits.

Merits of PDL Driver
   High speed processing of a page having a low load (engine throughput output is possible). Printing of characters, image-forming of a stretchable image, etc.
   No change in data size when gradation increases.

Demerits of PDL Driver
   Invalid output of RGB logical arithmetic processing (a color printer performs low speed processing when performing an inverse UCR process in the YMCK system).
   No upper limit in the size of data to be transferred, which may reduce printer-processing speed. There is no upper limit in the size of PDL data. Thus, when the memory is full of a large amount of image-forming object data, processing is continued by temporarily loading the data into an image memory, or reducing gradation or resolution, so that the processing speed may decrease.

Merits of Image Driver
   Upper limit in data size per page.
   A high-resolution image can be formed at high speed because the host side normally has a large memory capacity and the CPU has high processing speed.

Demerits of Image Driver
   A larger amount of data and a longer time are required compared with those of the PDL, which uses character codes for processing, because characters are loaded as character images.
   A dedicated hardware accelerator as built into the printer side cannot be utilized.

Since each of the image driver and the PDL driver has merits and demerits, as described above, each driver should be exclusively used. However, if the user does not set the optimal operation mode, printing may take an extremely long time, and the quality of a printed image may deteriorate. The user also must set the operation mode by using a combination of instructions on color gradation and resolution. Specifically, on the printer driver setting screen shown in FIG. 6, from among a plurality of predetermined icons, an icon which most represents the type of a document to be printed must be selected by the user. In this case, after the document is printed by selecting an icon "DOCUMENT/TABLE" since the document is made by a word-processing application, it may be found that, since the document actually has high-resolution image data as an attachment, selection of an icon "IMAGE 1", which activates image driver processing, can perform high speed processing.

Accordingly, a new type of printer driver has been developed which can select an optimal type of printing in place of the user. The new type of printer driver has the following three features:

1. When the user prefers high speed printing to high image quality, the printer driver can achieve stable speed performance. The printer driver includes a dynamic mechanism for switching between printer processing and host processing. The printer driver implements engine throughput by generating data in the PDL mode for a general page, and eliminates an extremely large printing time by controlling the host side to perform rasterization for a page having a heavy load on the printer side.

2. When the user prefers accurate printing to printing speed, the printer driver can automatically select a normal system of output processing. By performing prediction of inappropriate printing, the printer driver can automatically select an appropriate output processing system. The printer driver checks beforehand each of the PDL mode and the image mode for limitation, and avoids the limitation.

3. The printer driver is a means of providing an easy operation. The printer driver automatically selects the optimal mode of printing in place of the user. When the printer driver is compared with an automobile, it operates as an automatic car that does not perform manual shifting but selects an optimal gear. In other words, when the application software is used to perform print processing, print information in intermediate condition which is not dependent on a particular PDL is generated and is temporarily stored in a storage unit, and the stored print data is analyzed to automatically determine the optimal operation mode, whereby the printer driver exhibits operation in which only the merits of the PDL and image drivers are utilized.

In a printer driver of the above type, the process for automatically selecting the optimal operation mode is performed in the following manner.

A case in which the photograph-included document shown in FIG. 7 is printed by using a color laser-beam printer (LBP) is described below.

Figure 6:
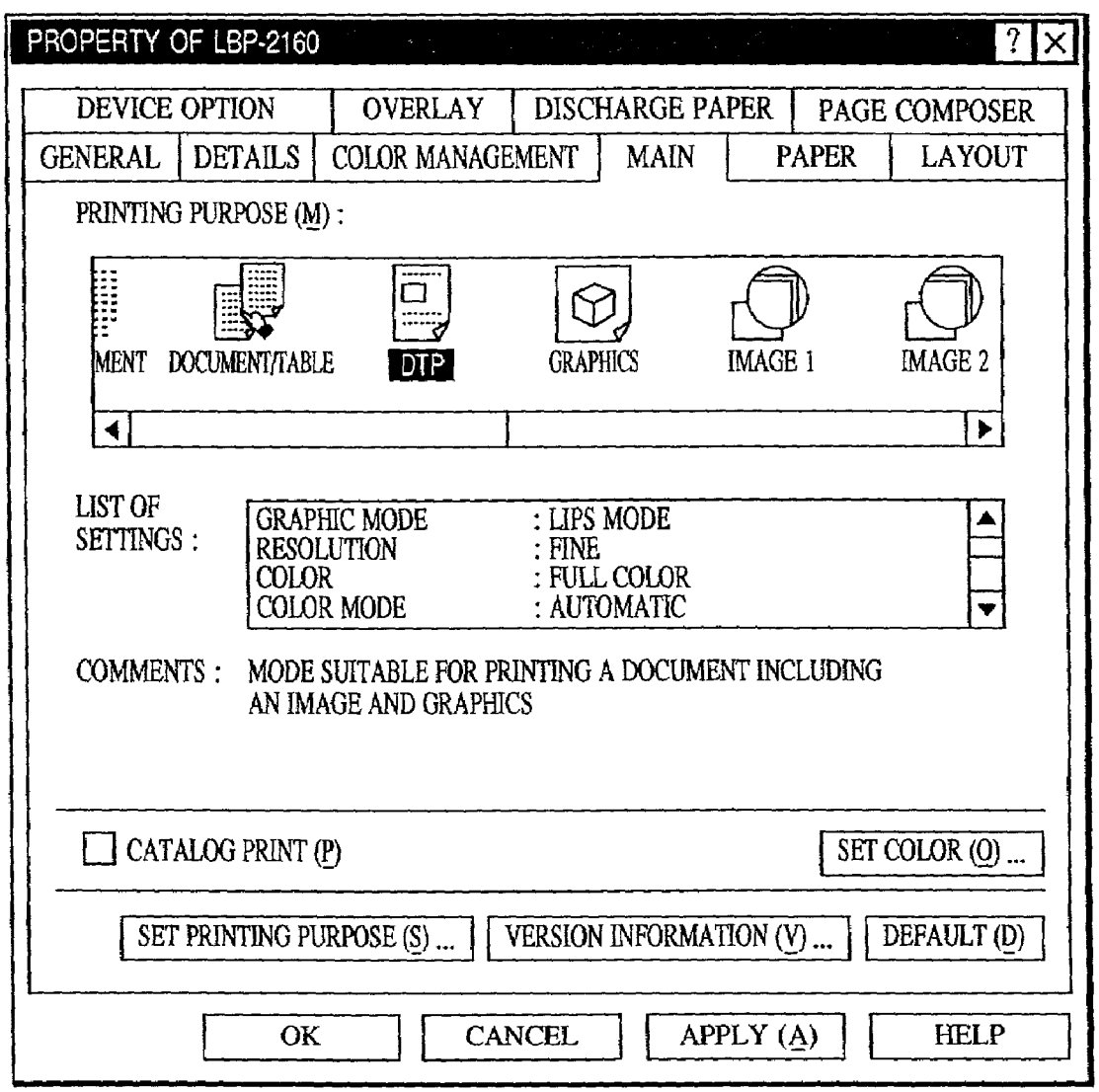
FIG. 6 is an illustration showing an example of an operation-mode-setting screen displayed by a related-art printer driver.

Since the document in FIG. 7 looks ordinary document data at first, an ordinary user will print the document by selecting the icon "DOCUMENT/TABLE" in FIG. 6 if it is displayed on the printer driver setting screen. By selecting the icon "DOCUMENT/TABLE", the printer driver operates as a PDL printer driver. However, the photograph portion is image data having an extremely high resolution and high gradation (specifically, 600-dpi original size, 8 bits for each of RGB). Accordingly, actually, selecting the icon "IMAGE 1" for image driver processing enables high speed processing. This is because, when converting high-resolution high-gradation image data into PDL commands, the image data is sent to the printer 100, with the high resolution and gradation unchanged. In other words, image data having a size represented by "image-width pixels" by "height pixels" by "gradation (the number of bits)" by "the number of planes (RGB form: 3)" is sent to the printer. However, the color LBP for use in this embodiment processes a color image not by using the RGB form but by using the YMCK form, and supports gradations not by using eight bits but by using up to two bits. Thus, the printer driver sends image information that is more redundant than printable image quality. In addition, a limited amount of the built-in memory of the printer causes a case in which, when high-resolution and high-gradation image data is sent to the printer, with its large size unchanged, the data cannot be retained in a page buffer in the printer. The content of the page buffer is loaded into an image-forming plane so that the area of the page buffer is free. This operation delays print processing by printer. Such a problem can be prevented if the amount of image data to be sent to the printer is found.

The printer driver 203 (shown in FIG. 3) described in this embodiment generates print information having intermediate condition which is not dependent on a particular PDL when the application 201 (in FIG. 3) is used to perform print processing. At this time, from the print information, which includes image data, the printer driver predicts two values, that is, how many bytes are required when converting the image data into PDL commands, and how many bytes are required when loading a print image beforehand into the renderer 306 (in FIG. 3) so as to match the output resolution and output gradation of the printer 100.

Therefore, when the print data shown in FIG. 7 is processed, the printer driver in this embodiment automatically selects as an optimal operation mode an operation in which the host side performs an image loading processing. The above method or process performs the process for automatically selecting the optimal operation mode. Nevertheless, there is also a case in which the automatic selection processing will not always be an optimal solution to all users. For example, although "IMAGE 1" is selected to output gradation using two bits, the user may not need such a level of gradation, or may need high-speed print processing. In this case, performing processing using one bit enables high speed. Also, the user may need high-quality printed matter, even if a large processing time is required, that is, the user may need a multi-gradation high-density image. The determination criterion required for the process for automatically selecting the optimal operation mode for each time is determined by user's preference. Thus, a priority determination criterion must be designated by the user.

The present invention is made as a result of paying attention to this respect. One feature of the present invention is that a criterion which is preset in the related art and which is required for automatically selecting an optimal operation mode is changed such that, after printing is performed by using the operation mode automatically selected with the criterion, or printing is performed by using an operation mode automatically selected with a certain criterion, the user selectively inputs evaluation of print processing or the result of printing. By making it intuitively easy for the user to selectively input the evaluation, the print data processing apparatus can easily receive instructions about the changed criterion for automatically selecting the optimal operation mode. In addition, by recording information on user's preference for each type of printed document, automatic selection based on the information of the optimal operation mode is performed when printing is performed the next time.

When the spooler 302 (in FIG. 3) generates print information in intermediate condition for each time, the detection information (shown in FIG. 9) for determining the optimal operation mode in order to print the print information is collected, and is recorded with the content of the print information. The detection information in FIG. 9 is broadly divided into general information on a print job and printing-details information. The general information includes the time and date of printing, a printer, the name of a file to be printed, the date of creation of the file, the date of updating of the file, the name of an application used for printing, the version number of the application, settings (driver operation state) on the user interface (UI) of the printer driver 203, and the total number of pages in a print job. The printing-details information is classified into three broad printing object types: text, graphics, and image. The information required for detection in each printing object type is collected. For example, regarding the text type, the number of characters and the point number of the maximum character size in the page are collected and recorded. Regarding the graphics type, the total number of graphics objects included in the page, and information on whether or not logical printing (raster operation (ROP)) is designated are collected. Similarly, regarding the image type, the resolution of an image to be rendered, etc., are collected.

After that, for each page, the type of document construction is determined and recorded. It is determined into which of "Large Number" level, "Intermediate Number" level, and "Small Number" level the already recorded number of characters in text is classified, and the result of the determination is represented by a numerical value. Specifically, "0" represents no object, "1" represents a small number, and "2" represents a large number. By similarly applying this representation to the graphics type and the image type, a three-digit value is formed in which the digits of the value correspond to the text type, the graphics type, and the image type, respectively. For example, the value "202" represents a document which has a large number of characters in text and a large number of images but does not include any graphics. The three-digit value is recorded, with the collected information.

Based on the obtained detection information, the optimal operation mode is determined. Specifically, regarding the text information, the maximum point size is compared with a threshold value. When the maximum point size is greater than the threshold value, it is determined that the image-forming process is performed on the host side. When the maximum point size is less than the threshold value, it is determined that the image-forming process is performed on the printer side. Regarding the graphics information, the number of objects is compared with a threshold value. When the number of objects is greater than the threshold value, it is determined that the image-forming process is performed on the host side. When the number of objects is less than the threshold value, it is determined that the image-forming process is performed on the printer side. Regarding the image information, resolution data, gradation data, and image-forming area data are used to predict the amount of data to be sent to the printer 100, which is generated when the image is converted into PDL commands. When the predicted amount of data is greater than an image size obtained when images are rendered and processed up to halftoning on the host side, it is determined that the image-forming process is performed on the host side. When the predicted amount of data is less than the image size, it is determined that the image-forming process is performed on the printer side. Regarding the ROP, when an ROP number which is not supported on the printer side is designated, it is determined that the image-forming process is performed on the host side. When the ROP number is not designated, it is determined that the image-forming process is performed on the printer side. Regarding each determination criterion, from among a determination criterion specified by the user, and recorded determination criteria, a determination criterion that corresponds to the result of classification of pages by document construction types is selected.

The optimal operation mode is automatically determined, as described above, and the print processing is executed in accordance with the determined processing method. A criterion for determining the optimal operation mode, which has been used, is, for example, one of criteria predetermined for possible cases in the printer driver 203.

One feature of the present invention is that the despooler 305 (in FIG. 3) queries the result of printing. At the time the processing of the entirety of printing information has ended, the user is requested to evaluate the result of printing by performing processing that outputs messages as shown in FIG. 10 about whether or not the used determination criterion is appropriate. Based on a user-selected determination criterion and the present determination criterion, a determination criterion for the next time is determined, and a determination criterion record according to the present document construction is updated. The present determination criterion is one used when performing the print processing which requests the user to evaluate the result of printing. The present determination criterion includes a criterion (default value) which is initially preset in the printer driver 203, and is updated after printing is performed.

The above sequential process is described below with reference to the flowchart shown in FIG. 11, which starts in step S111 at which print-data processing is started.

Figure 13:
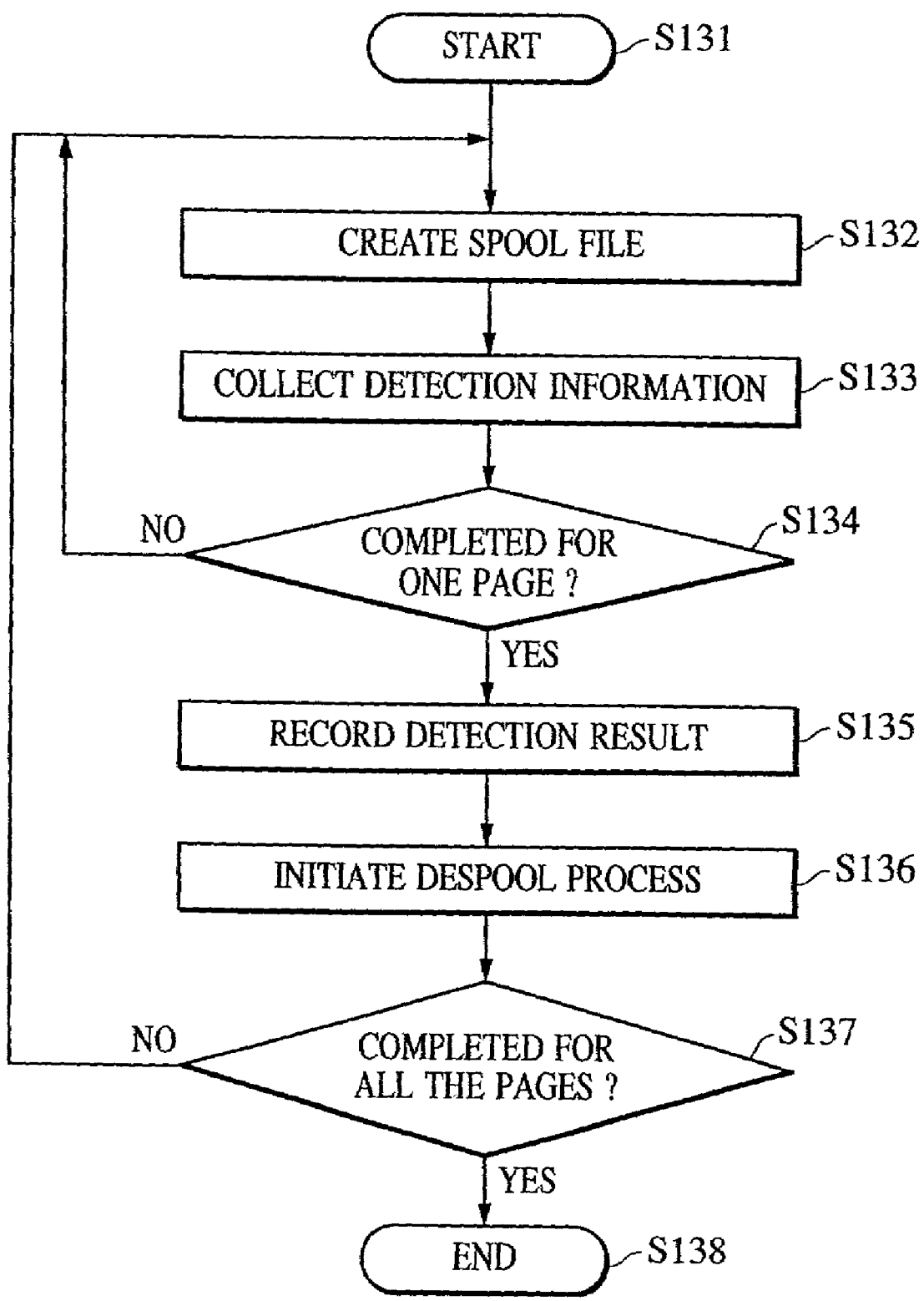
FIG. 13 is a flowchart showing a process performed by the spooler 302 in FIG. 3.
Figure 14:
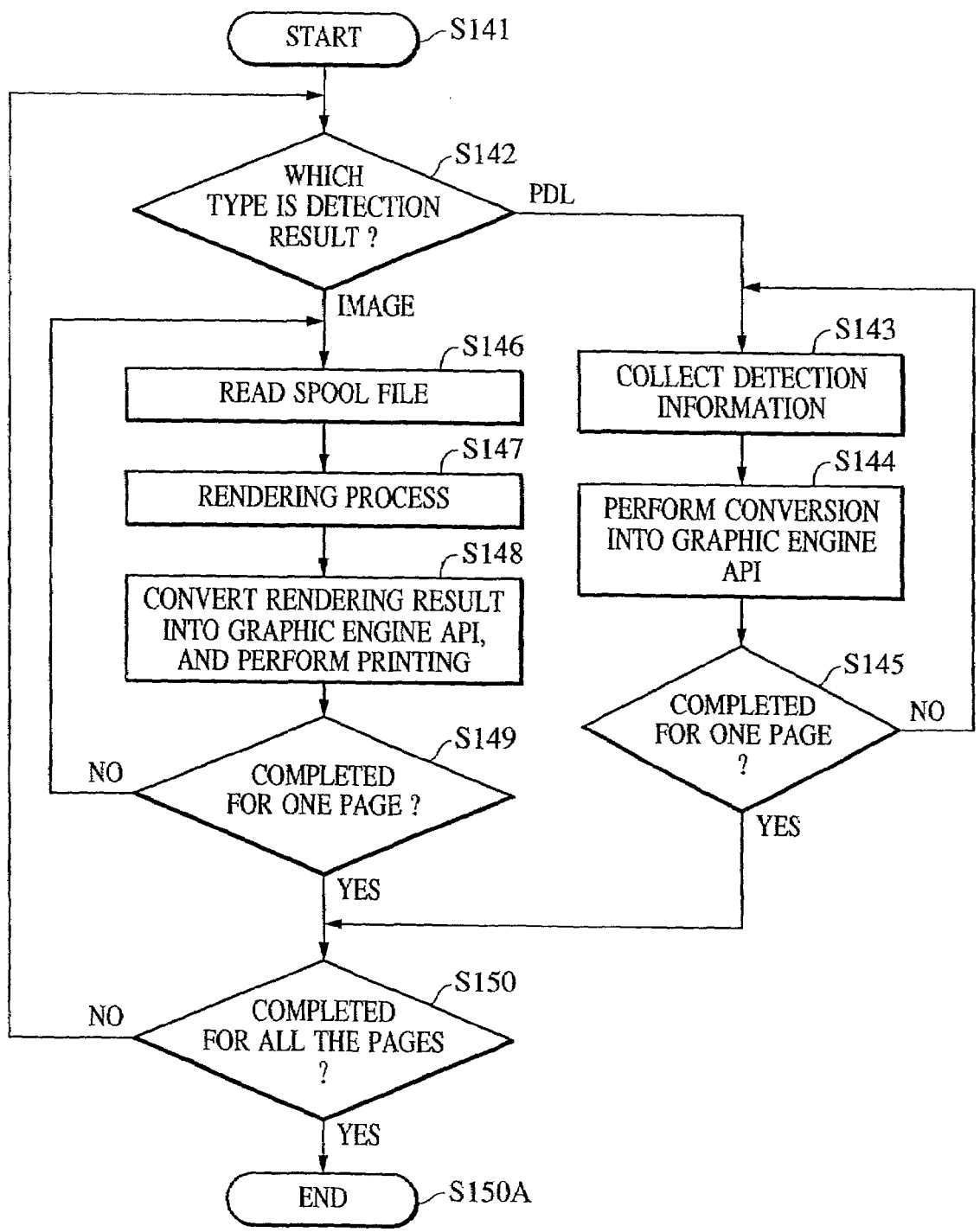
FIG. 14 is a flowchart showing a process performed by the despooler in FIG. 3.
Figure 15:
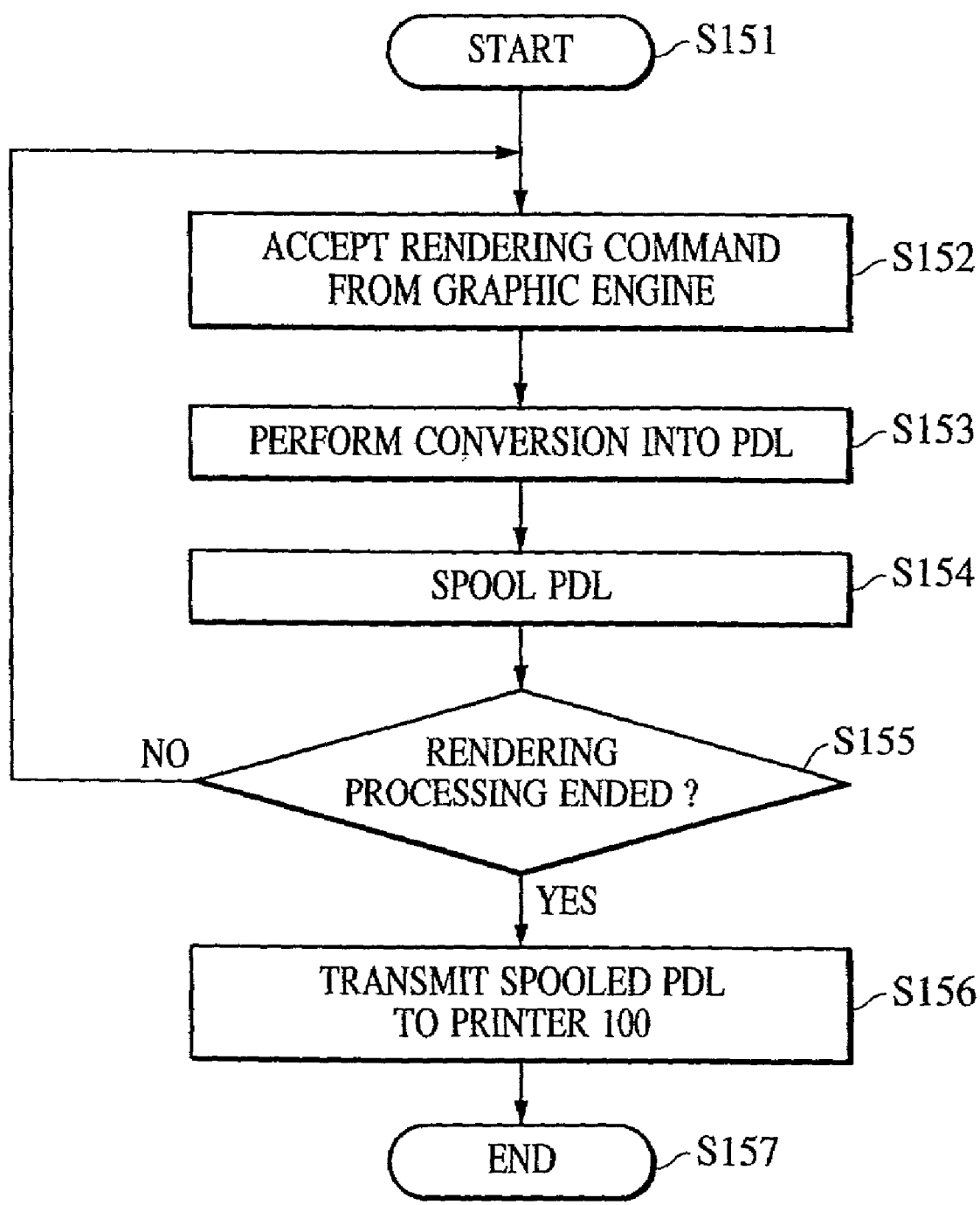
FIG. 15 is a flowchart showing a process performed by the printer driver 203 in FIG. 3.

In step S112, a print-data generating process is performed. FIGS. 13 to 15 are flowcharts illustrating step S112 (in FIG. 11) as the print processing performed in the structure shown in FIG. 3. FIG. 13 shows a process performed by the spooler 302 in FIG. 3. FIG. 14 shows a process performed by the despooler in FIG. 3. FIG. 15 shows a process performed by the printer driver 203 in FIG. 3.

In FIG. 13, when initialization is performed and the print processing is initiated in step S131, print information is transferred from the graphics engine 202. In step S132, the content of the print information is spooled as a file of intermediate print information which is not dependent on a particular PDL. In step S133, the detection information shown in FIG. 9 is also collected. In step S134, the spooler 302 determines whether or not steps S132 and S133 have been completed for one page. When both steps have been completed for one page, in step S135, the document construction type is detected and the detection result is recorded. In addition, by using the detection information collected in step S133, and the determination criterion designated by the user, or one of recorded determination criteria which corresponds to the type of a document classified, the optimal operation mode is determined, and the result is spooled as a file as shown in FIG. 8. These complete the information of one page to be spooled by the spooler 302. Thus, the despooler 305 that operates as a separate process is activated in step S136. If the despooler 305 has already been activated, nothing is performed in step S136. Since the despooler 305 operates in separate time-series as a separate process, the process of the despooler 305 is described below with reference to FIG. 14. In step S137, the spooler 302 determines whether or not steps S132 to S136 have been completed for all the pages. If the steps have not been completed, the spooler 302 returns to step S132, and repeatedly performs the subsequent steps. If the steps have been completed, the process of the spooler 302 ends in step S138.

Next, with reference to FIG. 14, the process of the despooler 305 is described below.

When initialization is performed and the despool process is initiated in step S141, the despooler 305 reads the file (in FIG. 8) containing the result of automatic detection of the operation mode, and reads the detection result of each page. In step S142, the despooler 305 determines whether the page should be processed on the printer side (indicated by "PDL" in FIG. 14) or the page should be processed on the host side (indicated by "IMAGE" in FIG. 14). If the page should be processed on the printer side, the despooler 305 proceeds to step S143. If the page should be processed on the host side, the despooler 305 proceeds to step S146. In step S143, the despooler 305 opens the spool file in which image-forming data and properties are spooled, and reads the contents of the spool file from the beginning. In step S144, the despooler 305 converts the spooled print information from the intermediate state into an API provided by the graphics engine 202, and uses the function of the graphics engine 202 to perform the print processing again. In step S145, the despooler 305 determines whether or not reproduction of the print information for one page has been completed, and repeatedly performs steps S143 and S144, as required. If the print information for one page has been reproduced, the despooler 305 proceeds to step S150 (described later).

If the despooler 305 has determined in step S142 that the page should be processed on the host side, that is, image-forming should be performed for the page, the despooler 305 proceeds to step S146. In step S146, the despooler 305 opens the spool file in which image-forming data and properties are spooled, and reads the contents of the spool file from the beginning. In step S147, the despooler 305 converts the spooled print information from the intermediate state into an API provided by the renderer 306, and performs image forming so that each piece of the print information becomes a print image. After the image-forming result becomes an image, in step S148, the image is converted into the API provided by the graphics engine 202, and the print processing is performed again by using the function of the graphics engine 202. After the despooler 305 repeatedly performs steps S146, S147, and S148, it determines in step S149 whether the steps have been completed for information for one page. If the steps have been completed, the despooler 305 determines in step S150 whether the steps have been completed for all the pages. If unprocessed page data remains, the despooler 305 returns to step S142 and repeatedly performs the subsequent steps. If unprocessed page data does not remain, the process of the despooler 305 ends in step S150A.

In the above flowchart, the image-forming process is performed as a separate process by graphics engine API calls. Specifically, the print processing is executed such that the graphics engine 202 dynamically links the printer driver 203. The process of the printer driver 203 is described below with reference to FIG. 15, which starts at step S151.

In step S152, the printer driver 203 (in FIG. 3) accepts an image-forming command from the application 201 (in FIG. 3) via the graphics engine 202 (in FIG. 3). In step S153, the printer driver 203 converts the command into the corresponding PDL data. In step S154, the PDL data is sent from the printer driver 203 to the system spooler 204 (in FIG. 3), and the system spooler 204 performs spooling of the PDL data in the RAM 2 or the external memory 11. In step S155, the printer driver 203 determines whether image-forming processing by the application 201 and the graphics engine 202 has ended. If the determination is negative, the printer driver 203 returns to step S152, and repeatedly performs the same steps. If the determination is affirmative, the printer driver 203 proceeds to step S156, and transmits, to the printer 100, the PDL data spooled by the system spooler 204, and the process of the printer driver 203 ends in step S157. A technique for generating the PDL command, which is executed by the printer driver 203, is characterized in that, since a PDL (drawing) command by which a geometric representation corresponding to vector graphics such as a line is formed is transmitted to the printer 100, the image-forming processing system and program of the printer 100 perform the generation (rasterization) of a print image. In this case, the time required for the print processing in the printer 100 is determined by the types of objects and the number of objects.

When all the steps of the print-data generating process in step S112 (in FIG. 11) are completed, in step S113, the user is queried about whether determination related to the present printing is appropriate, and the result of user's evaluation is accepted. Referring FIG. 12, Step S113 is further described in the following. In step S122, a message and options are displayed in a form as shown in FIG. 10, and a selected option as an input is accepted. After that, the selected option is recognized. When, for example, the "(PRINTING RESULT) IS SATISFACTORY THIS TIME" shown in FIG. 10 is accepted as an input, it is determined in step S123 that no change is detected before proceeding to step S126. When one of the options other than the "(PRINTING RESULT) IS SATISFACTORY THIS TIME" is selected and accepted, a determination criterion for the next time is determined (step S124) based on the selected option and the present determination criterion, and a determination criterion corresponding to the present document construction is updated (step S125). After that, the printing-result query process ends in step S126.

Figure 11:
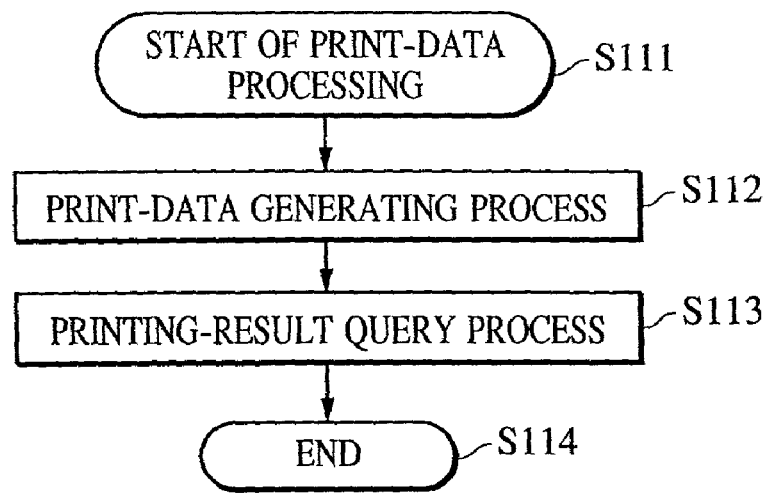
FIG. 11 is a flowchart showing an example of print data processing in a print control apparatus of the present invention.
Figure 12:
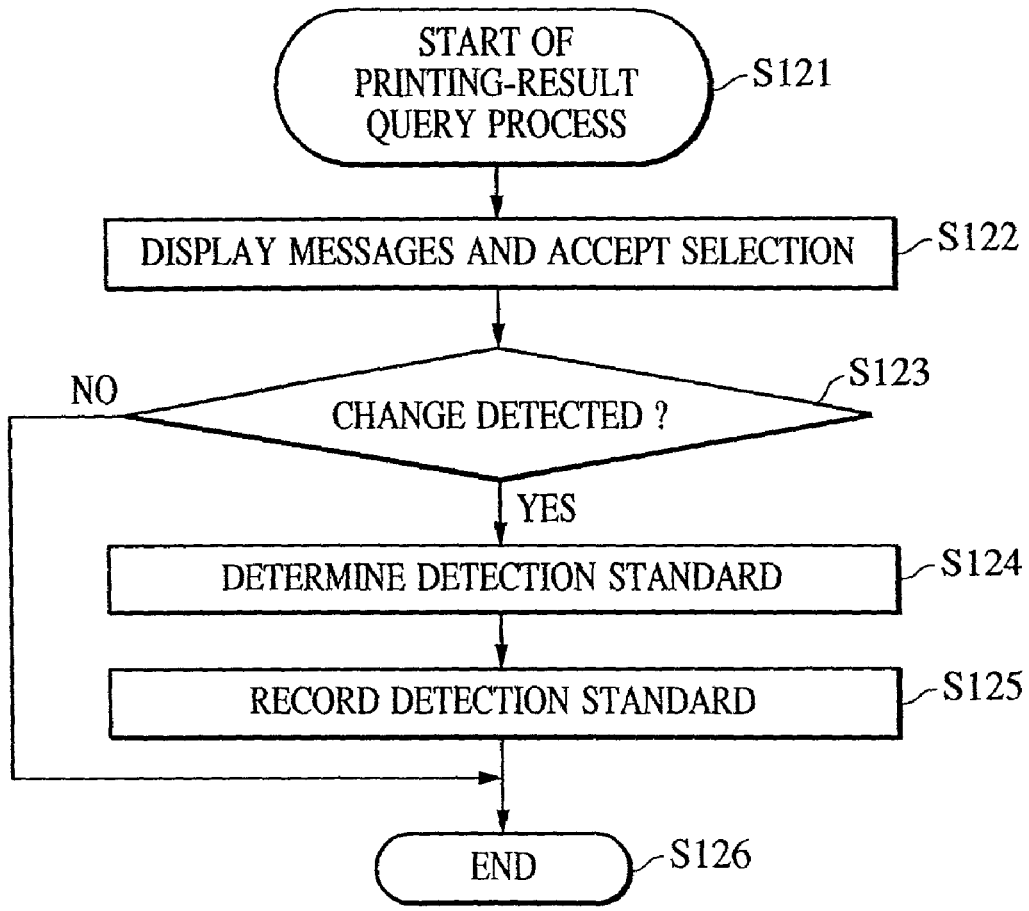
FIG. 12 is a flowchart showing a printing-result query process in a print control apparatus of the present invention.

When the printing-result query process ends in step S126 in FIG. 12, the print-data processing is completed in step S114 in FIG. 11.

This part is most characteristic of the present invention. By using the image (in FIG. 10) displayed in step S121 in FIG. 12, a query is displayed by using options. By selecting one of the options, the user can change an automatic determination criterion set by the manufacturer, and can easily switch the present settings to those which match user's preference or the purpose of printing.

By using FIGS. 10, 11, 12, 13, 14, and 15, the flow of processing in the embodiment of the present invention has been described. Although the image in FIG. 10 is exemplified as a simple form in order to show the contents of the query, the query does not need to have a form for querying all pages at a time, as shown in FIG. 10, but it is possible for the query to use units of pages, text/graphics/image units in each page, as shown in FIG. 9, or simply units of image-forming objects consisting of text, graphics, and images. In addition, immediately after a printer driver is introduced, when the user's response "(PRINTING RESULT) IS SATISFACTORY THIS TIME" as shown in FIG. 10 cannot be obtained for simple queries despite the execution of the print processing a plurality of times, it is possible that the query be gradually changed to a form using units of image-forming objects of each type. Regarding the above query and the storage of response thereto, when it is assumed that a plurality of users exist, it is natural to perform management for each user.

According to another embodiment of the present invention, when the spooler 302 (in FIG. 3) classifies pages to be printed into document construction types, the name of each application used for printing can also be included in a classification. In this case, the classification is represented by "application name+3-digit numerical value", and a determination criterion is recorded for each classification. When the name of an application that has not been used for printing is detected, a new recording area that includes a predetermined criterion (default) set in the printer driver 203 is created, and the criterion is updated when performing subsequent printing. In other words, when the printer driver 203 determines the printing mode, it retrieves, based on a determination criterion, an application name which is acquired by the API of the OS from an application which requests printing. The printer driver 203 determines the printing mode by using a determination criterion adapted for the application. Definitely, for simplifying processing, it is possible that each classification be formed only by an "application name". This facilitates determination in accordance with application characteristics, so that a small number of steps can reach settings desired by the user.

As described above, by managing classifications in a form in which an application name is included in each determination criterion, when an application for drawing figures requests printing, the printer driver 203 can determine the printing mode by using a determination criterion adapted for figure drawing. Also, when a word-processing application requests printing, the printer driver 203 can determine the printing mode by using a determination criterion adapted for character printing. Therefore, for a user who alternately uses a drawing application and a word-processing application, a determination criterion is controlled not to be different from that desired by the user, so that a user friendly printer driver can be provided.

According to another embodiment of the present invention, in addition to the construction of the above embodiment, by providing the printer driver 203 (in FIG. 3) with a user interface for instructing the printing-result query process to or not to function, the printing-result query process is executed only when it is instructed to function. Accordingly, also when the user dislikes the inconvenience of being constantly urged to select, the printing-result query process can be controlled not to be performed. By performing the printing-result query process, as required, the determination criterion can be updated.

Figure 17:
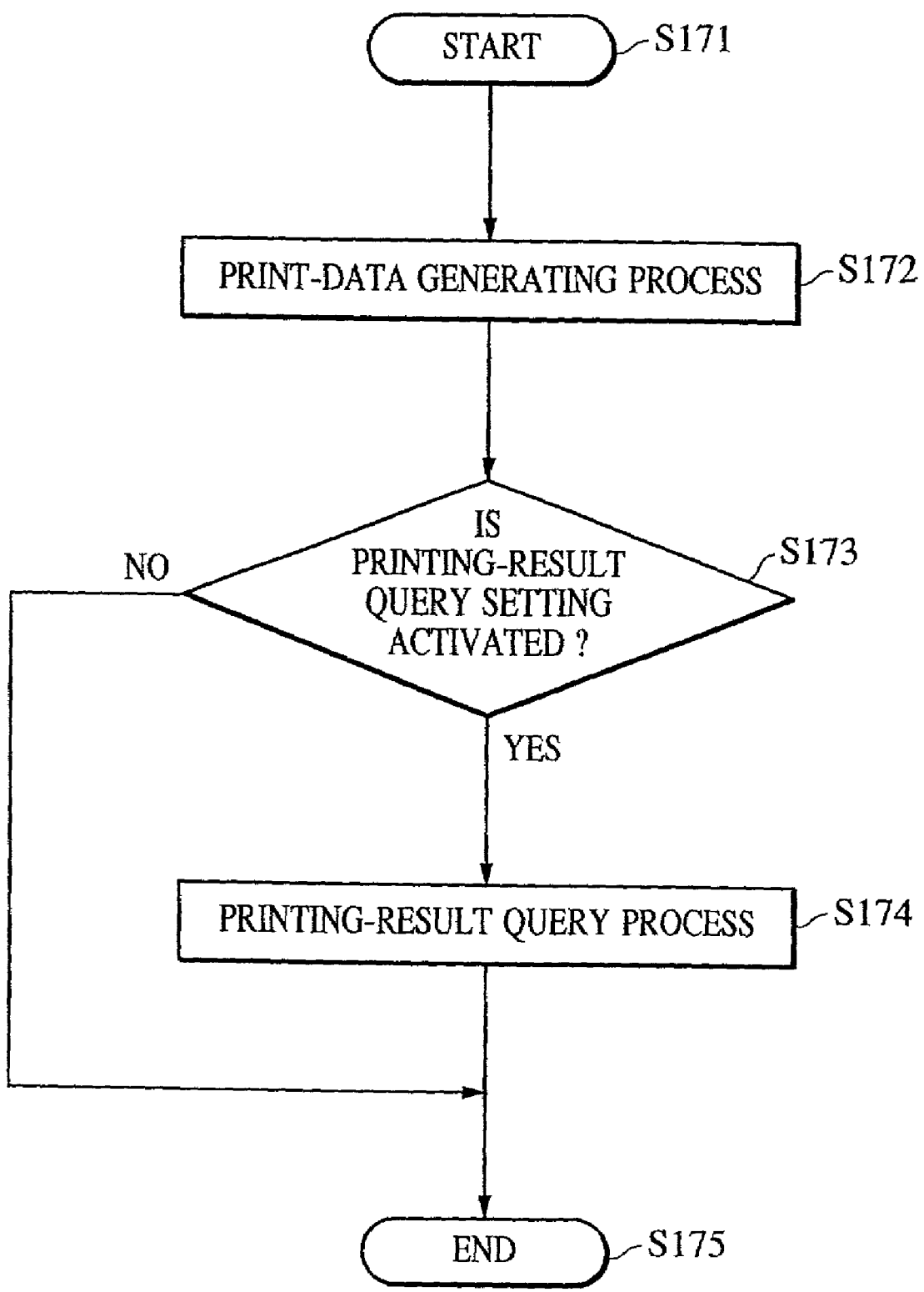
FIG. 17 is a flowchart showing an example of print data processing in a print control apparatus of the present invention.

With reference to the flowchart of FIG. 17, the above sequential process is described below.

After the printer driver 203 initiates a print-data processing in step S171, it performs a print-data generating process in step S172. The print-data generating process in step S172 is identical to that in step S112 shown in FIG. 11. In step S173, the printer driver 203 determines whether a printing-result query process is set to be activated. If the determination is affirmative, the printer driver 203 performs the printing-result query process, and terminates the print-data processing. The printing-result query process is identical to that in step S113. If the printer driver 203 has determined in step S173 that the printing-result query process is not set to be activated, the printing-result query process is not performed and at step S175 the print-data processing ends.

Figure 18:
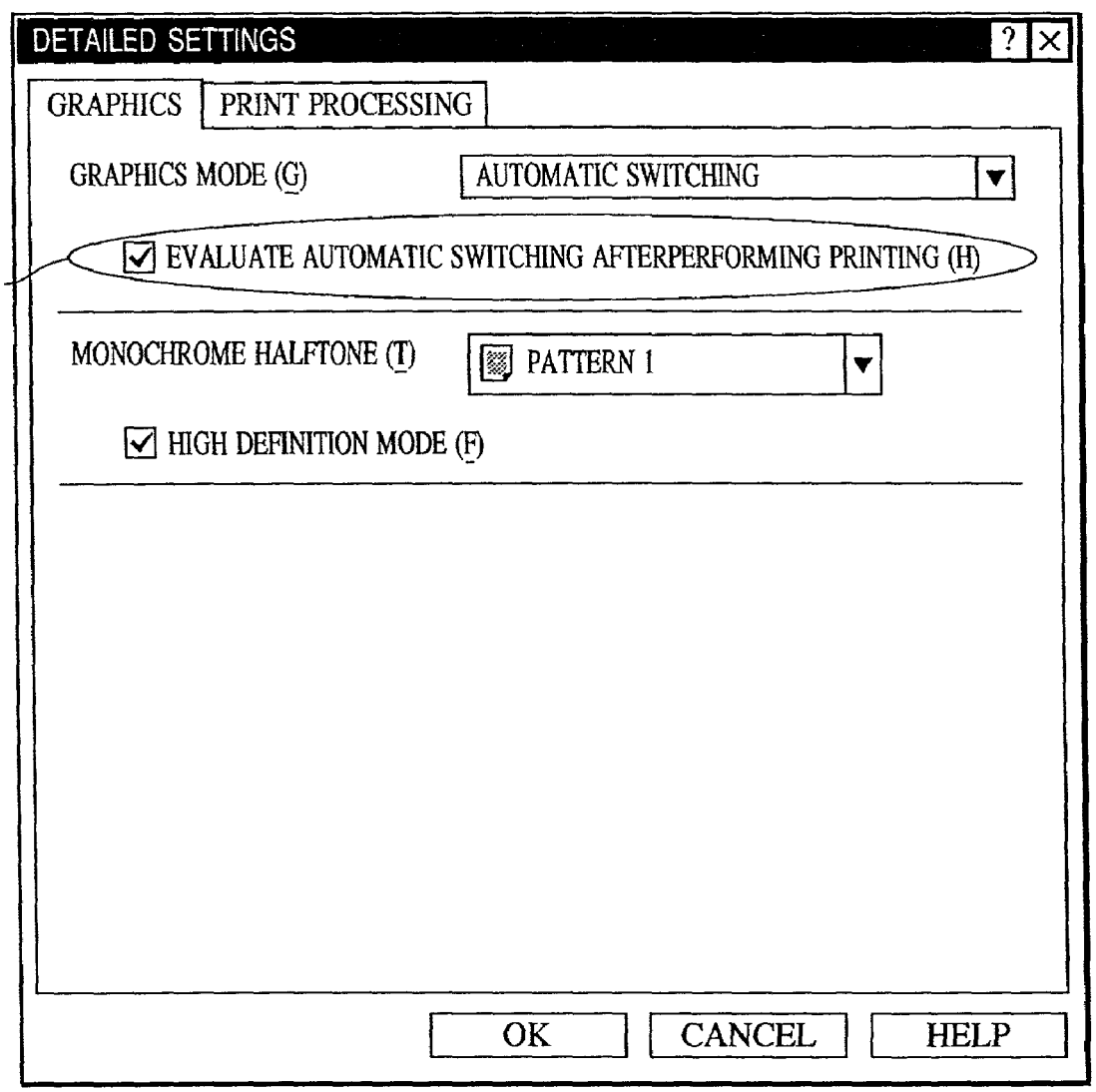
FIG. 18 is an illustration showing a printer-driver graphical-user interface which is displayed in print control apparatus of the present invention.
Figure 19:
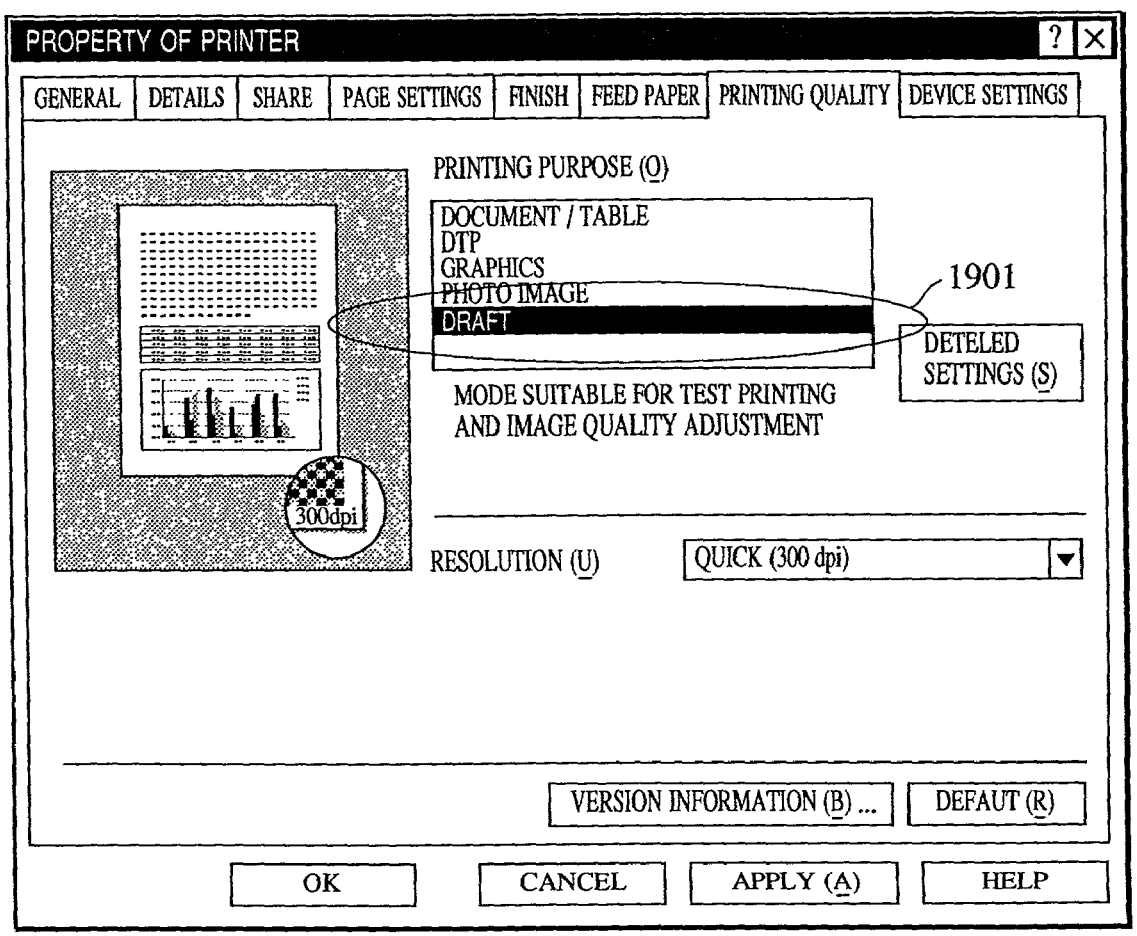
FIG. 19 is an illustration showing a printer-driver graphical-user interface which is displayed in print control apparatus of the present invention.

In an example of a user interface for instructing the printing-result query process to or not to function, it is possible that the user be allowed to select whether or the printing-result query process is performed, by using a check box 1801 (shown in FIG. 18) which indicates whether to evaluate automatic switching after performing printing. In this case, when the printer driver 203 is requested to perform printing, it determines whether the check box 1801 is checked. If the check box 1801 is checked, step S174 (in FIG. 17) may be performed. In addition, as an option 1901 in FIG. 19 shows, when one of printing purposes (functions) is selected, the printing-result query process can be performed. When no option is selected, the printing-result query process cannot be performed.

According to another embodiment of the present invention, in the printing-result query process, a query can also include not only an optimal-operation-mode determining criterion but also items (e.g., color matching) from which an item is selected depending on user's preference. In response to an item selected in the printing-result query process, settings on color matching for use in the next printing are determined, and in response to a page-unit document construction type obtained as the result of classifying print data, settings on color matching for use in printing for the next or later occasion are recorded. When despooling for the next or later occasion is performed, corresponding settings on color matching are used to perform printing.

Figure 16:
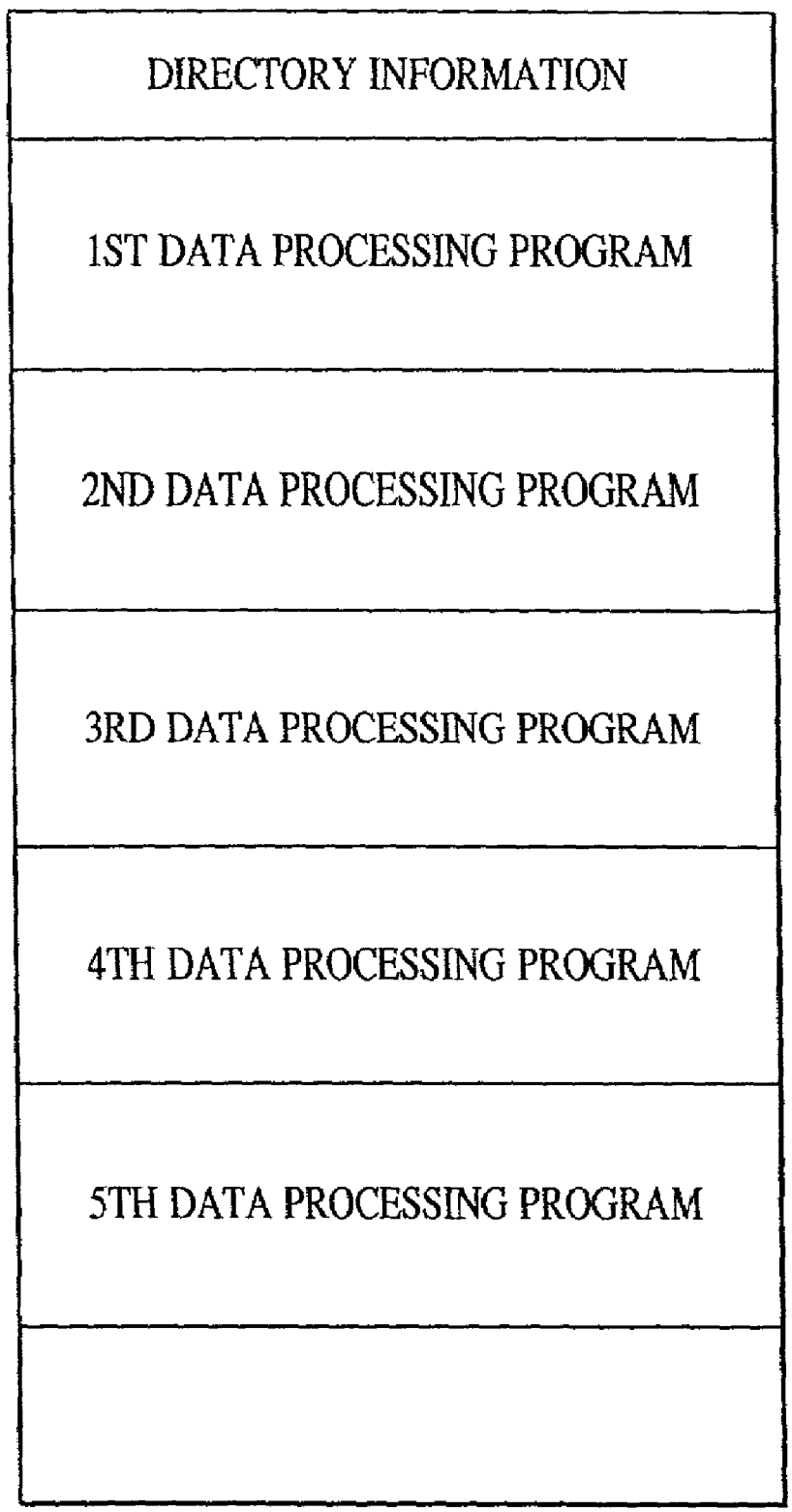
FIG. 16 is an illustration showing the memory map of a storage medium containing various data processing programs readable by a printing system to which a print control apparatus of the present invention is applied.

FIG. 16 illustrates the memory map of a storage medium containing various types of data processing programs readable by a printing system to which a print control apparatus according to the present invention is applied. In FIG. 16, direction information includes various types of data processing information which are shown below, for example, an installed program, and information representing the positions of storage areas containing the various files of a printer driver according to the present invention.

Information (not shown) for managing the programs stored in the storage medium, for example, version information, creator information, etc., are stored, and information (not shown) that is dependent on the OS or the like of a program-reading side, for example, icons which distinguishably display the programs may be stored.

In addition, also data that is dependent on the programs is managed by the directory information. The storage medium may store a program for installing the programs, and a program or the like for use in a case in which when a program to be installed is compressed, it is decompressed by the program or the like.

The processes shown in FIGS. 11 to 15 in the above embodiments may be performed by externally installed programs in a host computer. In this case, the present invention can be applied to even a case in which pieces of information including programs are supplied to the host computer either by using a storage medium such as a CD-ROM, a flash memory, or a floppy disk, or from an external storage medium via a network.

It is obvious that the object of the present invention can be also achieved such that a system or an apparatus is supplied with a storage medium containing the program code of software for implementing the functions of the foregoing embodiments, and the program code is read and executed by the computer (or a CPU or an MPU) of the system or the apparatus.

In this case, the program code itself which is read from the storage medium implements novel functions of the present invention. Thus, the storage medium containing the program code is included in the present invention. For example, a floppy disk, a hard disk, an optical disk, a magneto-optical disk, a DVD, a CD-ROM, a magnetic tape, a read-only memory, an EEPROM can be used as the storage medium.

In addition, it is obvious that the execution of the program code which is read from the computer includes, not only the implementation of the functions of the foregoing embodiments are implemented, but also a case in which the OS or the like of the computer performs based on the instructions of the program code the entirety or part of actual processing and the performed processing implements the functions of the foregoing embodiments. The execution of the program code which is read from the computer also includes a case in which, after the program code read from the storage medium is written in the memory of an add-in board inserted in the computer or a computer-connected add-in unit, the CPU or the like of the add-in board or unit performs based on the instructions of the program code the entirety or part of actual processing and the performed processing implements the functions of the foregoing embodiments.

As many apparently widely different embodiments of the present invention can be made without departing from the spirit and scope thereof, it is to be understood that the invention is not limited to the specific embodiments thereof except as defined in the appended claims.

As described above, according to the above embodiments, by performing the steps of generating, in response to a print request from an application program, print data in intermediate condition which is not dependent on a particular PDL, temporarily storing the generated print data, performing print processing after an optimal operation mode is determined by analyzing the stored print data, acquiring a response by querying a user about evaluation of printing speed or print produced in the completed print processing, storing a selection criterion for automatically selecting printing conditions for the next printing, which is determined based on the response, and determining an operation mode based on the stored selection criterion when print processing is performed in response to the next print request, print conditions for the next printing can be automatically selected so as to approach printing result desired by the user, and the user can control printing in the desired form, even if the user does not have special knowledge of the print processing and its result.

The criterion used when automatically selecting the optimal operation mode by analyzing the print data can be changed not to a predetermined criterion determined by a manufacturer beforehand, but to a criterion for selecting an operation mode in which printing is finally performed in the user-desired form. Thus, print processing which matches the user's system can be performed.

As described above, according to the present invention, in a print control method for performing print processing in an optimal operation mode which is automatically determined in response to a print request from an application program, by querying evaluation of a printing speed for the print processing or the quality of print produced by the print processing, a response is acquired, and when the print processing is performed in response to a later print request, an operation mode is determined based on the response acquired. Thus, the intention of the user can be reflected in a printing-mode automatic-selecting function can be provided in which printing is performed by using a particular printing mode selected based on the classified information from among a plurality of printing modes. Accordingly, dissatisfaction of the user can be eliminated.

In addition, according to the present invention, in the above construction, by analyzing the content of print information, the entirety of information to be printed is classified as what type of document, and a printing-mode automatic-selecting function can be provided in which printing is performed by using a particular printing mode selected based on the classified information from among a plurality of printing modes.

Moreover, according to the present invention, in the above construction, by recording a determined and evaluated operation mode for each application, when performing printing the next time, an operation mode can be determined in view of an application name.

According to the present invention, in the above construction, evaluation for reflecting the intention of the user can be performed by the printer driver 203 in response to a predetermined command such as test print.

What is claimed is:

1. A print control method of a printer driver for performing print processing in an operation mode which is automatically determined from among a plurality of operation modes in response to a print request from an application program, said print control method comprising the steps of:
   setting evaluation information indicating whether or not the operation mode is to be evaluated after printing;
   generating print data in an intermediate condition and temporarily storing the generated print data, wherein said print data generating step is responsive to the print request from the application program, and wherein the intermediate condition is independent of a particular page description language;
   analyzing the temporarily stored generated print data;
   determining the operation mode from among the plurality of operation modes based on a selection criterion and based on the analysis in said print data analyzing step;
   processing the temporarily stored generated print data in accordance with the determined operation mode;
   displaying an evaluation screen for querying evaluation of a printing quality for the print processing, after the print processing of the print data is finished, in a case where the evaluation information set in said setting step indicates that the operation mode is to be evaluated;
   acquiring an evaluation result input by a user via the evaluation screen displayed in said displaying step; and
   updating the selection criterion for determining said operation mode based on the evaluation result acquired in said evaluation acquisition step so as to effect a next determination of the operation mode,
   wherein, in order to enable the user to selectively input the evaluation result, options consisting of a print quality is satisfactory option, a printing should be faster option, a print should be clearer option, and a printing should be more accurate option are displayed in said displaying step.

2. A print control method according to claim 1, further comprising:
   a classification step of outputting classification data by analyzing the temporarily stored generated print data so that the print data is classified into one of classifications based on the type of the print data; and
   a storage step in which, based on the evaluation result acquired in said evaluation acquisition step and the classification data output in said classification step, the selection criterion is updated.

3. A print control method according to claim 2, wherein in said determination step determines the operation mode also based on the classification data.

4. A print control method according to claim 1, wherein said displaying step displays a plurality of options to query the evaluation of the printing speed for the print processing or the quality of print produced by the print processing, and wherein said evaluation acquisition step acquires a selected option as the evaluation result.

5. A print control method according to claim 1, further comprising a test-print designation step for designating a test print in which a process of querying the evaluation of the print is performed,
   wherein, when the test print is designated in said test-print designation step, the evaluation of the print is acquired in said evaluation acquisition step.

6. A print data processing apparatus for performing print processing in an operation mode which is automatically determined from among a plurality of operation modes in response to a print request from an application program, said print data processing apparatus comprising:
   setting means for setting evaluation information indicating whether or not the operation mode is to be evaluated after printing;
   print data generating means for generating print data in an intermediate condition and temporarily storing the generated print data, wherein said print data generating means responds to the print request from the application program, and wherein the intermediate condition is independent of a particular page description language;
   print data analyzing means for analyzing the temporarily stored generated print data;
   determining means for determining the operation mode from among the plurality of operation modes based on a selection criterion and based on the analysis in said print data analyzing means;
   print processing means for processing the temporarily stored generated print data in accordance with the determined operation mode;
   displaying means for displaying an evaluation screen for querying the user of said print data processing apparatus about evaluation of a printing quality for the print processing, after the print processing of the print data is finished, means in a case where the evaluation information set by said setting means indicates that the operation mode is to be evaluated;
   evaluation acquisition means for acquiring an evaluation result input by a user via the evaluation screen displayed by said displaying means; and
   updating means for updating the selection criterion for determining said operation mode based on the evaluation response acquired by said evaluation acquisition means so as to effect a next determination of the operation mode
   wherein, in order to enable the user to selectively input the evaluation result, options consisting of a print quality is satisfactory option, a printing should be faster option, a print should be clearer option, and a printing should be more accurate option are displayed by said displaying means.

7. A print data processing apparatus according to claim 6, further comprising:
   classification means for classifying the print data into one of classifications based on the type of the print data; and
   storage means in which, based on the evaluation result acquired by said evaluation acquisition means and the classification data obtained by said classification means, the selection criterion is updated.

8. A print data processing apparatus according to claim 7, wherein the determining means determines the operation mode also based on the classification data.

9. A print data processing apparatus according to claim 6, wherein said displaying means displays a plurality of options to query the evaluation of the printing speed for the print processing or the quality of print produced by the print processing, and wherein said evaluation acquisition means acquires a selected option as the evaluation result.

10. A print data processing apparatus according to claim 6, further comprising test-print designation means for designating a test print in which a process of querying the evaluation of the print is performed, wherein, when the test print is designated by said test-print designation means, the evaluation of the print is acquired by said evaluation acquisition means.

11. A computer-executable print control program stored on a computer-readable memory medium, said print control program for controlling a print data processing apparatus to execute print processing in an operation mode which is automatically determined from among a plurality of operation modes in response to a print request from an application program, said print control program comprising:

setting evaluation information indicating whether or not the operation mode is to be evaluated after printing;

generating print data in an intermediate condition and temporarily storing the generated print data, wherein said print data generating step is responsive to the print request from the application program, and wherein the intermediate condition is independent of a particular page description language;

analyzing the temporarily stored generated print data;

determining the operating mode from among the plurality of operation modes based on a selection criterion and based on the analysis in said print data analyzing step;

processing the temporarily stored generated print data in accordance with the determined operation mode;

displaying an evaluation screen for querying evaluation of a printing quality for the print processing, after the print processing of the print data is finished, in a case where the evaluation information set in said setting step indicates that the operation mode is to be evaluated;

acquiring an evaluation result input by a user via the evaluation screen displayed in said displaying step; and updating the selection criterion for determining said operation mode based on the evaluation result acquired in said response evaluation acquisition step so as to effect a next determination of the operation mode, wherein, in order to enable the user to selectively input the evaluation result, options consisting of a print quality is satisfactory option, a printing should be faster option, a print should be clearer option, and a printing should be more accurate option are displayed in said displaying step.

12. A computer-readable memory medium according to claim 11, further comprising:

a classification step of outputting classification data by analyzing the temporarily stored generated print data so that the print data is classified into one of classifications based on the type of the print data; and a storage step in which, based on the evaluation result acquired in said evaluation acquisition step and the classification data output in said classification step, the selection criterion is updated.

13. A computer-readable memory medium according to claim 12, wherein said determination step determines the operation mode also based on the classification data.

14. A computer-readable memory medium according to claim 11, wherein said displaying step displays a plurality of options to query the evaluation of the printing speed for the print processing or the quality of print produced by the print processing, and wherein said evaluation acquisition step acquires a selected option as the evaluation result.

15. A computer-readable memory medium according to claim 11, further comprising a test-print designation step for designating a test print in which a process of querying the evaluation of the print is performed, wherein, when the test print is designated in said test-print designation step, the evaluation of the print is acquired in said evaluation acquisition step.

16. A print control method according to claim 1, wherein said displaying step displays the evaluation screen for querying the evaluation of the printing quality for the print processing on a page to page basis.

17. A print control apparatus according to claim 6, wherein said displaying means displays the evaluation screen for querying the evaluation of the printing quality for the print processing on a page to page basis.

18. A computer-readable memory medium according to claim 11, wherein said displaying step displays the evaluation screen for querying the evaluation of the printing quality for the print processing on a page to page basis.

* * * * *

UNITED STATES PATENT AND TRADEMARK OFFICE
CERTIFICATE OF CORRECTION

| | |
|---|---|
| PATENT NO. | : 7,253,914 B2 |
| APPLICATION NO. | : 09/986254 |
| DATED | : August 7, 2007 |
| INVENTOR(S) | : Tomita |

It is certified that error appears in the above-identified patent and that said Letters Patent is hereby corrected as shown below:

SHEET 8:
FIG. 10, "CLEATER" should read -- CLEARER --.

SHEET 15:
FIG. 18, "AFTERPERFORMING" should read -- AFTER PERFORMING --.

SHEET 16:
FIG. 19, "DETELED" should read -- DETAILED --; and
FIG. 19, "DEFAUT (R)" should read -- DEFAULT (R) --.

COLUMN 1:
Line 31, "automatically" should read -- automatic --;
Line 38, "automatically" should read -- automatic --;
Line 40, "automatically" should read -- automatic --; and
Line 42, "matically" should read -- matic --.

COLUMN 3:
Line 14, "an" should be deleted;
Line 21, "options," should read -- the options, --;
Line 22, "print processing or" should read -- the print processing is --; and
Line 23, "desired" should read -- is desired --.

COLUMN 5:
Line 53, "a" should be deleted.

COLUMN 6:
Line 21, "output" should read -- outputs --; and
Line 51, "are" should read -- is --.

COLUMN 7:
Line 28, "drivers"." should read -- driver". --;
Line 63, "each of" should read -- both --; and
Line 63, "has" should read -- have --.

COLUMN 8:
Line 31, "each of" should read -- both --; and
Line 54, "looks" should read -- looks like --.

UNITED STATES PATENT AND TRADEMARK OFFICE
CERTIFICATE OF CORRECTION

PATENT NO. : 7,253,914 B2
APPLICATION NO. : 09/986254
DATED : August 7, 2007
INVENTOR(S) : Tomita It is certified that error appears in the above-identified patent and that said Letters Patent is hereby corrected as shown below:

COLUMN 10:
Line 20, "are" should read -- is --;
Line 22, "are" should read -- is --; and
Line 37, "recorded," should read -- recorded --.

COLUMN 11:
Line 55, "These complete" should read -- This completes --.

COLUMN 13:
Line 20, "Referring" should read -- Referring to --.

COLUMN 14:
Line 61, "or" should read -- or not --.

COLUMN 15:
Line 65, "ments" should read -- ments that --.

COLUMN 17:
Line 49, "classifications" should read -- the classifications --.

COLUMN 18:
Line 51, "classifications" should read -- the classifications --.

COLUMN 19:
Line 6, "A computer-executable print control program stored" should read -- A computer-readable memory medium storing a computer-executable print control program, --; and
Line 7, "on a computer-readable memory medium," should be deleted.

UNITED STATES PATENT AND TRADEMARK OFFICE
CERTIFICATE OF CORRECTION

PATENT NO. : 7,253,914 B2
APPLICATION NO. : 09/986254
DATED : August 7, 2007
INVENTOR(S) : Tomita It is certified that error appears in the above-identified patent and that said Letters Patent is hereby corrected as shown below:

COLUMN 20:
Line 33, "print control apparatus" should read -- print data processing apparatus --.

Signed and Sealed this

Twentieth Day of May, 2008

JON W. DUDAS
*Director of the United States Patent and Trademark Office*